(12) United States Patent
Rzeszutek et al.

(10) Patent No.: US 12,527,622 B2
(45) Date of Patent: Jan. 20, 2026

(54) SYSTEM FOR MINIMALLY INVASIVE TISSUE ABLATION AND SEALING

(71) Applicant: Innoblative Designs, Inc., Chicago, IL (US)

(72) Inventors: Zachary Rzeszutek, Chicago, IL (US); Tyler Wanke, Chicago, IL (US); Robert F. Rioux, Ashland, MA (US); Alyssa Bailey, Chicago, IL (US); Thomas Kurth, Chicago, IL (US)

(73) Assignee: Innoblative Designs, Inc., Chicago, IL (US)

( * ) Notice: Subject to any disclaimer, the term of this patent is extended or adjusted under 35 U.S.C. 154(b) by 789 days.

(21) Appl. No.: 17/712,282

(22) Filed: Apr. 4, 2022

(65) Prior Publication Data

US 2022/0338927 A1 Oct. 27, 2022

Related U.S. Application Data

(60) Provisional application No. 63/192,820, filed on May 25, 2021, provisional application No. 63/179,814, filed on Apr. 26, 2021.

(51) Int. Cl.
*A61B 18/14* (2006.01)
*A61B 18/18* (2006.01)
*A61B 18/00* (2006.01)

(52) U.S. Cl.
CPC .... *A61B 18/18* (2013.01); *A61B 2018/00083* (2013.01); *A61B 2018/00577* (2013.01);
(Continued)

(58) Field of Classification Search
CPC ............... A61B 18/14; A61B 18/18; A61B 2017/00946; A61B 2018/00083; A61B 2018/00577; A61B 2018/0063; A61B 2018/00708; A61B 2018/00744; A61B 2018/00791; A61B 2018/00875; A61B 2018/00916; A61B 2217/007; A61B 2218/002; A61B 2218/007; A61B 2562/0271
See application file for complete search history.

(56) References Cited

U.S. PATENT DOCUMENTS

| | | |
|---|---|---|
| 4,205,668 A | 6/1980 | Criddle |
| 4,699,147 A | 10/1987 | Chilson et al. |

(Continued)

FOREIGN PATENT DOCUMENTS

| | | |
|---|---|---|
| CN | 2610858 Y | 4/2004 |
| CN | 104546124 A | 4/2015 |

(Continued)

OTHER PUBLICATIONS

International Search Report and Written Opinion issued in International Application No. PCT/US2022/041881, date of mailing: Dec. 13, 2022, 26 pages.

(Continued)

*Primary Examiner* — Michael F Peffley
(74) *Attorney, Agent, or Firm* — Brown Rudnick LLP; Matthew P. York

(57) ABSTRACT

The present invention is an ablation device having a flexible and resilient shaft that can provide fluid to the site of ablation from a plurality of different fluid sources.

33 Claims, 17 Drawing Sheets

(52) U.S. Cl.
CPC ............... *A61B 2018/0063* (2013.01); *A61B 2018/00744* (2013.01); *A61B 2018/00791* (2013.01); *A61B 2018/00875* (2013.01); *A61B 2018/00916* (2013.01); *A61B 2217/007* (2013.01); *A61B 2562/0271* (2013.01)

(56) References Cited

U.S. PATENT DOCUMENTS

| | | | |
|---|---|---|---|
| 4,976,711 A | 12/1990 | Parins et al. |
| 4,979,948 A | 12/1990 | Geddes et al. |
| 5,015,243 A | 5/1991 | Schifano |
| 5,045,056 A | 9/1991 | Behl |
| 5,052,411 A | 10/1991 | Schoolman |
| 5,100,423 A | 3/1992 | Fearnot |
| 5,117,828 A | 6/1992 | Metzger et al. |
| 5,127,411 A | 7/1992 | Schoolman et al. |
| 5,159,921 A | 11/1992 | Hoover |
| 5,163,938 A | 11/1992 | Kambara et al. |
| 5,211,639 A | 5/1993 | Wilk |
| 5,334,193 A | 8/1994 | Nardella |
| 5,429,605 A | 7/1995 | Richling et al. |
| 5,471,982 A | 12/1995 | Edwards et al. |
| 5,472,441 A | 12/1995 | Edwards et al. |
| 5,486,161 A | 1/1996 | Lax et al. |
| 5,536,267 A | 7/1996 | Edwards et al. |
| 5,562,720 A | 10/1996 | Stern et al. |
| 5,657,760 A | 8/1997 | Ying et al. |
| 5,672,153 A | 9/1997 | Lax et al. |
| 5,672,173 A | 9/1997 | Gough et al. |
| 5,672,174 A | 9/1997 | Gough et al. |
| 5,683,384 A | 11/1997 | Gough et al. |
| 5,713,942 A | 2/1998 | Stern et al. |
| 5,728,143 A | 3/1998 | Gough et al. |
| 5,772,590 A | 6/1998 | Webster, Jr. |
| 5,782,827 A | 7/1998 | Gough et al. |
| 5,792,140 A * | 8/1998 | Tu ..................... A61B 18/08 |
| | | | 606/41 |
| 5,827,276 A | 10/1998 | LeVeen et al. |
| 5,840,076 A | 11/1998 | Swanson et al. |
| 5,846,239 A | 12/1998 | Swanson et al. |
| 5,855,576 A | 1/1999 | LeVeen et al. |
| 5,863,290 A | 1/1999 | Gough et al. |
| 5,868,736 A | 2/1999 | Swanson et al. |
| 5,868,776 A | 2/1999 | Wright |
| 5,871,483 A | 2/1999 | Jackson et al. |
| 5,888,198 A | 3/1999 | Eggers et al. |
| 5,891,136 A | 4/1999 | McGee et al. |
| 5,893,647 A | 4/1999 | Mochizuki |
| 5,893,847 A | 4/1999 | Kordis |
| 5,913,855 A | 6/1999 | Gough et al. |
| 5,928,229 A | 7/1999 | Gough et al. |
| 5,935,123 A | 8/1999 | Edwards et al. |
| 5,941,873 A | 8/1999 | Korenfeld |
| 5,961,513 A | 10/1999 | Swanson et al. |
| 5,980,517 A | 11/1999 | Gough |
| 6,009,877 A | 1/2000 | Edwards |
| 6,032,077 A | 2/2000 | Pomeranz |
| 6,036,689 A | 3/2000 | Tu et al. |
| 6,053,913 A | 4/2000 | Tu et al. |
| 6,053,937 A | 4/2000 | Edwards et al. |
| 6,063,081 A | 5/2000 | Mulier et al. |
| 6,071,278 A | 6/2000 | Panescu et al. |
| 6,071,280 A | 6/2000 | Edwards et al. |
| 6,099,526 A | 8/2000 | Whayne et al. |
| 6,112,123 A | 8/2000 | Kelleher et al. |
| 6,123,718 A | 9/2000 | Tu et al. |
| 6,142,993 A | 11/2000 | Whayne et al. |
| 6,221,071 B1 | 4/2001 | Sherry et al. |
| 6,241,666 B1 | 6/2001 | Pomeranz et al. |
| 6,251,109 B1 | 6/2001 | Hassett et al. |
| 6,258,087 B1 | 7/2001 | Edwards et al. |
| 6,309,352 B1 | 10/2001 | Oraevsky et al. |
| 6,312,408 B1 | 11/2001 | Eggers et al. |
| 6,312,429 B1 | 11/2001 | Burbank et al. |
| 6,315,776 B1 | 11/2001 | Edwards et al. |
| 6,358,248 B1 | 3/2002 | Mulier et al. |
| 6,379,353 B1 | 4/2002 | Nichols |
| 6,409,722 B1 | 6/2002 | Hoey et al. |
| 6,425,877 B1 | 7/2002 | Edwards |
| 6,454,766 B1 | 9/2002 | Swanson et al. |
| 6,475,213 B1 | 11/2002 | Whayne et al. |
| 6,491,710 B2 | 12/2002 | Satake |
| 6,494,902 B2 | 12/2002 | Hoey et al. |
| 6,503,247 B2 | 1/2003 | Swartz et al. |
| 6,522,930 B1 | 2/2003 | Schaer et al. |
| 6,537,248 B2 | 3/2003 | Mulier et al. |
| 6,537,272 B2 | 3/2003 | Christopherson et al. |
| 6,544,262 B2 | 4/2003 | Fleischman |
| 6,551,310 B1 | 4/2003 | Ganz et al. |
| 6,585,732 B2 | 7/2003 | Mulier et al. |
| 6,623,481 B1 | 9/2003 | Garbagnati et al. |
| 6,638,275 B1 | 10/2003 | McGaffigan et al. |
| 6,648,883 B2 | 11/2003 | Francischelli et al. |
| 6,663,622 B1 | 12/2003 | Foley et al. |
| 6,692,466 B1 | 2/2004 | Chow et al. |
| 6,736,810 B2 | 5/2004 | Hoey et al. |
| 6,736,811 B2 | 5/2004 | Panescu et al. |
| 6,743,226 B2 | 6/2004 | Cosman et al. |
| 6,764,487 B2 | 7/2004 | Mulier et al. |
| 6,770,072 B1 | 8/2004 | Truckai et al. |
| 6,780,183 B2 | 8/2004 | Jimenez, Jr. et al. |
| 6,805,131 B2 | 10/2004 | Kordis |
| 6,826,421 B1 | 11/2004 | Beatty et al. |
| 6,849,073 B2 | 2/2005 | Hoey et al. |
| 6,872,206 B2 | 3/2005 | Edwards et al. |
| 6,878,149 B2 | 4/2005 | Gatto |
| 6,942,650 B1 | 9/2005 | Schultz et al. |
| 6,955,641 B2 | 10/2005 | Lubock |
| 6,978,788 B2 | 12/2005 | Klimberg et al. |
| 6,984,232 B2 | 1/2006 | Vanney et al. |
| 7,104,989 B2 | 9/2006 | Skarda |
| 7,150,745 B2 | 12/2006 | Stern et al. |
| 7,156,845 B2 | 1/2007 | Mulier et al. |
| 7,169,144 B2 | 1/2007 | Hoey et al. |
| 7,247,155 B2 | 7/2007 | Hoey et al. |
| 7,276,061 B2 | 10/2007 | Schaer et al. |
| 7,306,593 B2 | 12/2007 | Keidar et al. |
| 7,311,708 B2 * | 12/2007 | McClurken ........ A61B 18/1492 |
| | | | 606/50 |
| 7,326,208 B2 | 2/2008 | Vanney et al. |
| 7,344,535 B2 | 3/2008 | Stern et al. |
| 7,364,579 B2 | 4/2008 | Mulier et al. |
| 7,367,972 B2 | 5/2008 | Francischelli et al. |
| 7,371,231 B2 | 5/2008 | Rioux et al. |
| 7,399,299 B2 | 7/2008 | Daniel et al. |
| 7,416,552 B2 * | 8/2008 | Paul ..................... A61B 18/1492 |
| | | | 606/41 |
| 7,419,489 B2 | 9/2008 | Vanney et al. |
| 7,507,234 B2 | 3/2009 | Utley et al. |
| 7,507,238 B2 | 3/2009 | Edwards et al. |
| 7,530,979 B2 | 5/2009 | Ganz et al. |
| 7,556,628 B2 | 7/2009 | Utley et al. |
| 7,632,268 B2 | 12/2009 | Edwards et al. |
| 7,717,909 B2 | 5/2010 | Strul et al. |
| 7,769,432 B2 | 8/2010 | Klimberg et al. |
| 7,776,034 B2 | 8/2010 | Kampa |
| 7,828,793 B2 | 11/2010 | Thompson et al. |
| 7,862,498 B2 | 1/2011 | Nguyen et al. |
| 7,879,030 B2 | 2/2011 | Paul et al. |
| 7,942,873 B2 | 5/2011 | Kwan et al. |
| 7,959,627 B2 | 6/2011 | Utley et al. |
| 7,959,628 B2 | 6/2011 | Schaer et al. |
| 7,959,631 B2 | 6/2011 | DiCarlo |
| 7,967,816 B2 * | 6/2011 | Ocel ..................... A61B 18/14 |
| | | | 606/49 |
| 7,993,336 B2 | 8/2011 | Jackson et al. |
| 7,997,278 B2 | 8/2011 | Utley et al. |
| 8,012,149 B2 | 9/2011 | Jackson et al. |
| 8,034,022 B2 | 10/2011 | Boatman |
| 8,043,289 B2 | 10/2011 | Behl et al. |
| 8,048,069 B2 | 11/2011 | Skwarek et al. |
| 8,114,071 B2 | 2/2012 | Woloszko et al. |
| 8,224,416 B2 | 7/2012 | de la Rama et al. |
| 8,303,584 B2 | 11/2012 | Burdio Pinilla et al. |

(56) References Cited

U.S. PATENT DOCUMENTS

| | | |
|---|---|---|
| 8,388,573 B1 | 3/2013 | Cox |
| 8,398,624 B2 | 3/2013 | Rioux et al. |
| 8,409,193 B2 | 4/2013 | Young et al. |
| 8,444,638 B2 | 5/2013 | Woloszko et al. |
| 8,465,484 B2 | 6/2013 | Davalos et al. |
| 8,465,486 B2 | 6/2013 | Danek et al. |
| 8,518,018 B2 | 8/2013 | Minskoff et al. |
| 8,588,886 B2 | 11/2013 | de la Rama et al. |
| 8,591,461 B2 | 11/2013 | Boatman |
| 8,617,158 B2 | 12/2013 | Garabedian et al. |
| 8,623,010 B2 * | 1/2014 | Ocel ............... A61N 1/056 606/41 |
| 8,647,339 B2 | 2/2014 | Satake |
| 8,657,814 B2 | 2/2014 | Werneth et al. |
| 8,734,439 B2 | 5/2014 | Gough et al. |
| 8,814,855 B2 | 8/2014 | DiCarlo et al. |
| 8,834,461 B2 | 9/2014 | Werneth et al. |
| 8,979,838 B2 | 3/2015 | Woloszko et al. |
| 8,979,841 B2 | 3/2015 | Kunis et al. |
| 9,078,665 B2 | 7/2015 | Moss et al. |
| 9,131,980 B2 | 9/2015 | Bloom |
| 9,730,639 B2 * | 8/2017 | Toth ............... A61M 25/00 |
| 9,839,472 B2 | 12/2017 | Rioux et al. |
| 9,848,936 B2 | 12/2017 | Rioux et al. |
| 9,855,098 B2 | 1/2018 | Rioux |
| 10,070,921 B2 | 9/2018 | Rioux et al. |
| 10,470,818 B2 | 11/2019 | Rioux et al. |
| 10,786,305 B2 | 9/2020 | Mahvi et al. |
| 11,083,519 B2 | 8/2021 | Rioux et al. |
| 2001/0031941 A1 | 10/2001 | Edwards et al. |
| 2002/0026186 A1 | 2/2002 | Woloszko et al. |
| 2002/0062123 A1 | 5/2002 | McClurken et al. |
| 2002/0087208 A1 | 7/2002 | Koblish et al. |
| 2002/0095152 A1 | 7/2002 | Ciarrocca et al. |
| 2002/0115992 A1 | 8/2002 | Utley et al. |
| 2002/0120259 A1 | 8/2002 | Lettice et al. |
| 2002/0120267 A1 | 8/2002 | Phan |
| 2002/0128641 A1 | 9/2002 | Underwood et al. |
| 2003/0009166 A1 | 1/2003 | Moutafis et al. |
| 2003/0036680 A1 | 2/2003 | Black |
| 2003/0079309 A1 | 5/2003 | Vandenbelt et al. |
| 2003/0130711 A1 | 7/2003 | Pearson et al. |
| 2003/0163128 A1 | 8/2003 | Patil et al. |
| 2003/0216725 A1 | 11/2003 | Woloszko et al. |
| 2003/0225403 A1 | 12/2003 | Woloszko et al. |
| 2003/0233099 A1 | 12/2003 | Danaek et al. |
| 2004/0049165 A1 | 3/2004 | Thompson et al. |
| 2004/0087936 A1 | 5/2004 | Stern et al. |
| 2004/0092960 A1 | 5/2004 | Abrams et al. |
| 2004/0122352 A1 | 6/2004 | John |
| 2005/0004535 A1 | 1/2005 | Schklair |
| 2005/0049454 A1 | 3/2005 | Ouchi |
| 2005/0054993 A1 | 3/2005 | Falahee |
| 2005/0059965 A1 | 3/2005 | Eberl et al. |
| 2005/0070894 A1 | 3/2005 | McClurken |
| 2005/0154386 A1 | 7/2005 | West et al. |
| 2005/0187491 A1 | 8/2005 | Burbank et al. |
| 2006/0069385 A1 | 3/2006 | Lafontaine et al. |
| 2006/0212032 A1 | 9/2006 | Daniel et al. |
| 2006/0259027 A1 | 11/2006 | Kwan et al. |
| 2007/0083195 A1 | 4/2007 | Werneth et al. |
| 2007/0100201 A1 | 5/2007 | Komiya et al. |
| 2008/0004534 A1 | 1/2008 | Gelbart et al. |
| 2008/0015565 A1 | 1/2008 | Davison |
| 2008/0103494 A1 | 5/2008 | Rioux et al. |
| 2008/0140001 A1 | 6/2008 | Globerman et al. |
| 2008/0234673 A1 | 9/2008 | Marion et al. |
| 2009/0171340 A1 | 7/2009 | Young |
| 2009/0177193 A1 | 7/2009 | Wang et al. |
| 2009/0248021 A1 | 10/2009 | McKenna |
| 2009/0292177 A1 | 11/2009 | Eggers et al. |
| 2009/0299355 A1 | 12/2009 | Bencini et al. |
| 2010/0114087 A1 | 5/2010 | Edwards et al. |
| 2010/0256629 A1 | 10/2010 | Wylie et al. |
| 2010/0292689 A1 | 11/2010 | Davison et al. |
| 2010/0330893 A1 | 12/2010 | Turner et al. |
| 2011/0172485 A1 | 7/2011 | Lubock |
| 2011/0257646 A1 | 10/2011 | Utley et al. |
| 2012/0029510 A1 | 2/2012 | Haverkost |
| 2012/0029511 A1 | 2/2012 | Smith et al. |
| 2012/0059437 A1 | 3/2012 | Shalev |
| 2012/0109250 A1 | 5/2012 | Cates et al. |
| 2012/0172680 A1 | 7/2012 | Gelfand et al. |
| 2012/0271253 A1 | 10/2012 | Schultz |
| 2012/0289776 A1 | 11/2012 | Keast et al. |
| 2013/0030425 A1 | 1/2013 | Stewart et al. |
| 2013/0085493 A1 | 4/2013 | Bloom et al. |
| 2013/0109924 A1 | 5/2013 | Gan |
| 2013/0131649 A1 | 5/2013 | Hughett, Sr. et al. |
| 2013/0158536 A1 | 6/2013 | Bloom |
| 2013/0172870 A1 | 7/2013 | Germain et al. |
| 2013/0184702 A1 | 7/2013 | Neal, II et al. |
| 2013/0184706 A1 | 7/2013 | Gelbart et al. |
| 2013/0253506 A1 | 9/2013 | Rioux et al. |
| 2013/0274728 A1 | 10/2013 | Kapur et al. |
| 2013/0310833 A1 | 11/2013 | Brown et al. |
| 2013/0338662 A1 | 12/2013 | Weber |
| 2014/0018788 A1 | 1/2014 | Engelman et al. |
| 2014/0018794 A1 | 1/2014 | Anderson et al. |
| 2014/0031810 A1 | 1/2014 | Mahvi et al. |
| 2014/0039491 A1 | 2/2014 | Bakos et al. |
| 2014/0058343 A1 | 2/2014 | Schultz |
| 2014/0058376 A1 | 2/2014 | Horn et al. |
| 2014/0180273 A1 | 6/2014 | Nair |
| 2014/0221998 A1 | 8/2014 | Latterell |
| 2014/0228801 A1 | 8/2014 | Keeling |
| 2014/0276731 A1 | 9/2014 | Voegele et al. |
| 2014/0276748 A1 | 9/2014 | Ku et al. |
| 2014/0296842 A1 | 10/2014 | Mansi et al. |
| 2014/0378960 A1 | 12/2014 | Fischer et al. |
| 2015/0018817 A1 | 1/2015 | Willard |
| 2015/0141982 A1 | 5/2015 | Lee |
| 2015/0306361 A1 | 10/2015 | Feig et al. |
| 2016/0015444 A1 | 1/2016 | Wittenberger |
| 2016/0045197 A1 | 2/2016 | Mitelberg et al. |
| 2016/0113707 A1 | 4/2016 | Sahakian et al. |
| 2016/0113708 A1 | 4/2016 | Moss et al. |
| 2016/0117221 A1 | 4/2016 | Nair et al. |
| 2016/0184008 A1 | 6/2016 | Papaioannou et al. |
| 2016/0317221 A1 | 11/2016 | Rioux |
| 2017/0000559 A1 | 1/2017 | Rioux et al. |
| 2017/0027633 A1 | 2/2017 | Wham et al. |
| 2017/0119454 A1 | 5/2017 | Rioux et al. |
| 2017/0172646 A1 | 6/2017 | Patel et al. |
| 2017/0215947 A1 | 8/2017 | Rioux et al. |
| 2017/0215951 A1 | 8/2017 | Wang et al. |
| 2017/0252092 A1 | 9/2017 | Rioux et al. |
| 2017/0281255 A1 | 10/2017 | Babini et al. |
| 2017/0281267 A1 | 10/2017 | Rioux et al. |
| 2017/0281271 A1 | 10/2017 | Rioux |
| 2018/0014880 A1 | 1/2018 | Rioux et al. |
| 2018/0076336 A1 | 3/2018 | De Graff et al. |
| 2018/0078305 A1 | 3/2018 | Rioux et al. |
| 2018/0104004 A1 | 4/2018 | Rioux et al. |
| 2018/0132833 A1 | 5/2018 | Gotlib |
| 2018/0153637 A1 | 6/2018 | Al-Shawi et al. |
| 2019/0104933 A1 * | 4/2019 | Stern ............... A61B 1/307 |
| 2019/0314084 A1 | 10/2019 | Rioux |
| 2020/0246069 A1 * | 8/2020 | Rioux ............... A61B 18/1492 |
| 2021/0275244 A1 | 9/2021 | Rioux et al. |

FOREIGN PATENT DOCUMENTS

| | | |
|---|---|---|
| DE | 102010032932 A1 | 2/2012 |
| EP | 0777445 B1 | 6/1999 |
| EP | 2942023 A3 | 2/2016 |
| EP | 3040043 B1 | 1/2018 |
| JP | 3009735 B2 | 2/2000 |
| JP | 2010-505596 A | 2/2010 |
| JP | 2010-155083 A | 7/2010 |
| JP | 2013-532552 A | 8/2013 |
| JP | 2015-100706 A | 6/2015 |
| JP | 2016-127919 A | 7/2016 |
| WO | 9510326 A1 | 4/1995 |

(56) References Cited

FOREIGN PATENT DOCUMENTS

| WO | 9942047 A1 | 8/1999 |
|---|---|---|
| WO | 0051683 A1 | 9/2000 |
| WO | 01/74252 A2 | 10/2001 |
| WO | 2007/103986 A2 | 9/2007 |
| WO | 2011/143468 A2 | 11/2011 |
| WO | 2012/015722 A1 | 2/2012 |
| WO | 2012/050637 A1 | 4/2012 |
| WO | 2013134733 A3 | 11/2013 |
| WO | 2014/022379 A1 | 2/2014 |
| WO | 2014/189887 A2 | 11/2014 |
| WO | 2015/142674 A1 | 9/2015 |
| WO | 2015/163846 A1 | 10/2015 |
| WO | 2015/200518 A1 | 12/2015 |
| WO | 2016/176567 A1 | 11/2016 |
| WO | 2016/181316 A1 | 11/2016 |
| WO | 2016/181318 A1 | 11/2016 |
| WO | 2019023328 A1 | 1/2019 |

OTHER PUBLICATIONS

"Starburst Talon" Specifications Brochure, Angiodynamics, 2013 (2 pages).
Chinese Office Action and English summary issued in Chinese Application No. 201680062908.2, date of mailing: Jun. 30, 2020 (12 pages).
Extended European Search Report issued European Patent Application No. 18839274.0, date of mailing: Mar. 15, 2021 (9 pages).
Extended European Search Report issued in European Application No. 13825361.2, date of mailing: Jun. 10, 2016 (13 pages).
Extended European Search Report issued in European Application No. 16787228.2, date of mailing: Nov. 27, 2018 (6 pages).
Extended European Search Report issued in European Application No. 16860886.7, date of mailing: Jun. 12, 2019 (8 pages).
Extended European Search Report issued in European Application No. 17747970.6, date of mailing: Jul. 16, 2019 (6 pages).
Extended European Search Report issued in European Application No. 17828289.3, date of mailing: Feb. 6, 2020 (5 pages).
Extended European Search Report issued in European Application No. 17895158.8, date of mailing: Feb. 28, 2020 (8 pages).
Extended European Search Report issued in European Application No. 18757994.1, date of mailing: Nov. 24, 2020 (8 pages).
Extended European Search Report issued in European Application No. 19219030.4, date of mailing: Jun. 26, 2020 (6 pages).
Extended European Search Report issued in European Patent Application No. 18812643.7, date of mailing: Feb. 9, 2021 (7 pages).
Extended European Search Report issued in European Patent Application No. 18839345.8, date of mailing: Mar. 12, 2021 (9 pages).
International Search Report and Written Opinion issued by the International Searching Authority for International Application No. PCT/US2020/033355, mailed Aug. 27, 2020 (4 pages).
International Search Report and Written Opinion issued by the International Searching Authority for International Application No. PCT/US2020/033355, mailed Aug. 27, 2020 (5 pages).
International Search Report and Written Opinion issued in International Application No. PCT/US2018/043658, date of mailing: Nov. 15, 2018 (13 pages).
International Search Report and Written Opinion issued in International Application No. PCT/US2020/033355, date of mailing: Aug. 27, 2020 (4 pages).
International Search Report and Written Opinion issued in International Application No. PCT/US2020/033357, date of mailing: Aug. 27, 2020 (5 pages).
International Search Report and Written Opinion of the Interational Searching Authority mailed Feb. 27, 2018 for International Application No. PCT/US2017/056754 (11 pages).
International Search Report and Written Opinion of the International Searching Authority issued in International Application No. PCT/US2020/033355, mailed: Aug. 27, 2020 (4 pages).
International Search Report and Written Opinion of the International Searching Authority Mailed Aug. 22, 2016 for International Application No. PCT/US2016/030081 (11 pages).
International Search Report and Written Opinion of the International Searching Authority Mailed Aug. 26, 2018 for International Application No. PCT/US2017/059850 (10 pages).
International Search Report and Written Opinion of the International Searching Authority Mailed Aug. 5, 2015 for International Application No. PCT/US2015/020596 (13 pages).
International Search Report and Written Opinion of the International Searching Authority Mailed Feb. 2, 2017 for International Application No. PCT/US2016/059345 (10 pages).
International Search Report and Written Opinion of the International Searching Authority Mailed Jun. 11, 2017 for International Application No. PCT/US2017/019398 (27 pages).
International Search Report and Written Opinion of the International Searching Authority Mailed May 16, 2017 for International Application No. PCT/US2017/015582 (11 pages).
International Search Report and Written Opinion of the International Searching Authority Mailed May 16, 2017 for International Application No. PCT/US2017/015584 (11 pages).
International Search Report and Written Opinion of the International Searching Authority Mailed Nov. 1, 2018 for International Application No. PCT/US2018/043654 (10 pages).
International Search Report and Written Opinion of the International Searching Authority Mailed Nov. 15, 2018 for International Application PCT/US2018/043658 (15 pages).
International Search Report and Written Opinion of the International Searching Authority Mailed Nov. 29, 2013 for International Application No. PCT/US2013/052703 (11 pages).
International Search Report and Written Opinion of the International Searching Authority Mailed Oct. 19, 2017 for International Application No. PCT/US2017/041501 (63 pages).
International Search Report and Written Opinion of the International Searching Authority Mailed Sep. 16, 2018 for International Application No. PCT/US2018/036268 (11 pages).
International Search Report and Written Opinion of the International Searching Authority mailed: Aug. 27, 2020 for International Application No. PCT/US2020/033355 (4 pages).
International Search Report and Written Opinion of the International Searching Authority mailed: Aug. 27, 2020 for International Application No. PCT/US2020/033355 (5 pages).
International Search Report and Written Opinion of the International Searching Authority mailed: Aug. 27, 2020 Issued in International Application No. PCT/US2020/033355, (4 pages).
International Search Report and Written Opinion of the International Searchng Authority mailed Jun. 6, 2018 for International Application No. PCT/US2018/019151 (17 pages).
International Search Report issued in International Application No. PCT/US2020/033355, date of mailing: Aug. 27, 2020 (2 pages).
International Search Report mailed Aug. 27, 2020 for International Allication No. PCT/US2020/033355 (2 pages).
ISA—Search Strategy—Issued by the Israel Patent Office for International Application No. PCT/US2018/043658, date of mailing: Nov. 14, 2018 (1 page).
Japanese Office Action and English translation issued in Japanese Application No. 2018-521973, date of mailing: Nov. 4, 2020 (8 pages).
Medtronic, "Aquamantys Bipolar Sealers." Electrosurgical Products, Jun. 2017. Retrieved Jul. 21, 2017. <http://www.medtronic.com/us-en/healthcare-professionals/products/general-surgery/electrosurgical/aquamantys-bipolar-sealers.html> (11 pages).
Non-Final Office Action issued in U.S. Appl. No. 16/001,494, date of mailing: Nov. 26, 2021, 18 pages.
Non-Final Office Action Mailed Aug. 11, 2017 for U.S. Appl. No. 15/337,334 (11 pages).
Non-Final Office Action Mailed Aug. 11, 2017 for U.S. Appl. No. 15/624,327 (11 pages).
Non-Final Office Action Mailed Aug. 4, 2017 for U.S. Appl. No. 15/624,230 (18 pages).
Non-Final Office Action Mailed May 7, 2018 for U.S. Appl. No. 15/142,616 (13 pages).
Notice of Allowance mailed Jul. 24, 2018 for U.S. Appl. No. 15/784,778 (12 pages).

(56) References Cited

OTHER PUBLICATIONS

Office Action issued in U.S. Appl. No. 16/633,765, date of mailing: Nov. 5, 2021, 9 pages.
Official Action issued in Japanese Patent Application No. 2018-540040, date of mailing: Jun. 19, 2019 (11 pages).
Response to Non-Final Office Action Filed Sep. 19, 2017 for U.S. Appl. No. 15/624,327 (8 pages).
Final Rejection issued in U.S. Appl. No. 16/876,284, date of mailing: Aug. 12, 2022, 14 pages.
Non-Final Office Action issued in U.S. Appl. No. 16/633,934, date of mailing: Jul. 25, 2022, 19 pages.
European Office Action issued in European Application No. 18839345.8, date of mailing: May 23, 2022, 4 pages.
Response to Non-Final Office Action Filed Sep. 20, 2017 for U.S. Appl. No. 15/337,334 (6 pages).
Response to Non-Final Office Action Filed Sep. 20, 2017 for U.S. Appl. No. 15/624,230 (10 pages).
PInternational Search Report and Written Opinion of the International Searching Authority Mailed Sep. 16, 2018 for International Application No. PCT/US2018/036268 (11 pages).
International Search Report and Written Opinion issued in International Application No. PCT/US2022/011296, date of mailing: Mar. 25, 2022, 9 pages.
Non-Final Office Action issued in U.S. Appl. No. 16/876,284, date of mailing: Apr. 19, 2022, 13 pages.
"Aquamantys System" Product Brochure, Medtronic, 2014 (12 pages).

\* cited by examiner

SYSTEM FOR MINIMALLY INVASIVE TISSUE ABLATION AND SEALING

CROSS REFERENCE TO RELATED APPLICATIONS

This application claims the benefit of, and priority to, U.S. Provisional Patent Application No. 63/179,814, filed Apr. 26, 2021, and also U.S. Provisional Patent Application No. 63/192,820, filed May 25, 2021, the entire contents of each of which are incorporated herein by reference.

TECHNICAL FIELD

The present disclosure relates generally to medical devices, and, more particularly, to tissue ablation devices configured to achieve coagulation, or hemostatic sealing, of a tissue.

BACKGROUND INFORMATION

Many minimally-invasive medical procedures require surgery to cut or carry soft tissue away. For example, during hepatic transection, one or more lobes of a liver containing abnormal tissue, such as malignant tissue or fibrous tissue caused by cirrhosis, are cut away. Regardless of the electrosurgical device used, extensive bleeding can occur, which can obstruct the surgeon's view and lead to dangerous blood loss levels, requiring transfusion of blood, which increases the complexity, time, and expense of the procedure, as well as the recovery time of the patient.

In order to prevent extensive bleeding or accumulation of fluid during surgery and to promote healing after surgery, hemostatic mechanisms, such as blood inflow occlusion, coagulants, as well as energy coagulation (e.g., electrosurgical coagulation or argon-beam coagulation) can be used. Unlike resection, which involves application of highly intense and localized heating sufficient enough to break intercellular bonds, energy coagulation of tissue involves the application of low-level current that denatures cells to a sufficient depth without breaking intercellular bonds, i.e., without cutting the tissue.

SUMMARY OF THE INVENTION

Current energy coagulation devices include various drawbacks. For example, many include probes attached to stiff, metallic shafts which cannot effectively maneuver through a tortuous anatomy. Still others include malleable probes, which can be easily bent when they encounter an obstacle, causing them to be irretrievably pushed offline when inserted into a cavity. Moreover, most current ablation devices do not provide the ability to selectively flow different fluids through the device to the wound site without removing the device or changing the fluid source. As such, great care must be taken when using such energy coagulation devices in order to reduce charring of tissue, avoid tissue from becoming stuck on the device, and most importantly, to minimize the increase of tissue resistance, so as to avoid reducing the efficiency of the overall procedure. Unfortunately, regardless of the care taken, the current energy coagulation modalities result in long procedure times and variable ablation depths, making it nearly impossible to maintain hemostasis at the treatment site.

The present invention relates to minimally-invasive ablation devices configured to destroy precise areas of tissue in a consistent manner in an effort to achieve coagulation. The systems and methods described herein can be used, for example, during a resection procedure to coagulate cross-sectional tissue of the resection site so as to prevent or stop fluid accumulation (e.g., blood from vessel(s)) as a result of the resection of tissue. Accordingly, the ablation device of the present invention may be particularly useful during or after procedures involving the removal of unhealthy, or otherwise undesired, tissue from any part of the body. Thus, for example, a tumor may be removed via a surgical intervention, and the ablation devices described herein can then be used to coagulate the tissue of the resection site.

The presently disclosed ablation devices include a handle connected to a shaft, the distal end of which includes electrodes for delivering radiofrequency (RF) energy. The handle allows a medical professional to manually manipulate the distal end of the device. Also or alternatively, the handle allows for a connection to a surgical robot for manipulating the device.

In certain devices of the invention, the shaft is bendable and resilient, and made from a non-conductive material, such as a polymer. Preferably, the shaft has a small cross section allowing it to access confined spaces. Because the shaft is bendable, it can contort around tortuous anatomy as it is inserted into a treatment site. However, because the shaft is concurrently resilient, it resists axial compression (i.e., in the direction from the distal top to the handle) and lateral compression. Thus, the shaft possesses an inherent stiffness, despite its small cross section, such that a force axial to the handle and shaft can be applied to firmly position the electrodes at the tip-to-tissue interface. This allows the ablation device to precisely apply RF energy to a desired location and/or provide sufficient mechanical force to assist in a particular procedure, e.g., to perforate, tamponade, or cut a tissue. Moreover, being resilient, rather than malleable like a shaft made from a metal, the shaft may return to its original shape, e.g., protruding axially from the handle. Thus, if the device encounters an obstacle during insertion, it will not be irretrievably deflected from a target site.

The ablation devices of the disclosure also include ports at the distal end from which fluid, such as conductive fluid, is dispersed. The fluid may be dispersed under an applied pressure to, for example, facilitate irrigation. The present devices may employ more than one fluid source to provide the fluid. In certain aspects, a single switch on the device can be used to activate the flow of fluid and control the fluid source providing the fluid. Moreover, the same switch can include a means, like a mechanical linkage, that interrupts the flow of RF energy to the electrodes and flow of fluid through the device. By preventing the flow of RF energy in the absence of fluid, the presently disclosed devices may reduce injury or complications, such as thrombus and char formation, which result from excessive heating of the tissue at the tip-to-tissue interface.

In certain aspects, the present disclosure provides a medical device that includes a handle with a bendable, non-conductive shaft extending distally from the handle. The shaft includes a distal tip with at least one pair of electrodes on an exterior surface of a distal end of the distal tip. The distal tip also includes at least one fluid port configured to distribute fluid to an exterior surface of the distal tip. The fluid port may be in fluid communication with an interior space of the distal tip. The device further includes a control switch, such as a three-way switch. Articulating the control switch may cause fluid to flow from one of a plurality of fluid sources to the interior space and cause the electrodes to emit RF energy.

In certain aspects, the bendable non-conductive shaft is resilient. In certain aspects, the bendable non-conductive shaft is malleable or partially malleable.

In certain aspects, the handle of the device includes a lumen for receiving fluid from the fluid sources. The lumen is in fluid communication with the interior chamber of the distal tip, such that fluid can pass from the fluid sources to the lumen along the shaft to the interior space, at which point it passes through the fluid ports on the distal tip of the shaft.

The plurality of fluid sources may include a first fluid source and a second fluid source. The first and second fluid sources may respectively provide a first and second fluid to the device. The first fluid may, for example, be a conductive fluid through which RF energy passes from the electrodes to the targeted tissue. Concurrently, the second fluid may be a conductive fluid or a non-conductive fluid. In certain aspects, the fluids are the same fluid. The fluids may be provided to the device at different temperatures. In certain aspects, the fluids are different.

In certain aspects, the first fluid source is an intravenous bag, while the second is a syringe or syringe pump.

In certain devices, each pair of electrodes on the distal tip includes a supply electrode and return electrode. Each electrode may comprise an isolated wire disposed on the exterior surface of the distal end of the device. The distal end of the device may include a convex outer surface with a hemi-elliptical or hemi-ovoidal shape. This shape can provide a rounded, atraumatic tip that can easily pass through a tortuous anatomy. Moreover, as the tip is rounded, it can provide a smaller and more precise tip-to-tissue interface. Advantageously, the rounded tip further enables a physician to provide ablative energy across small, targeted tissue surface area, while concurrently ablating the tissue to a great depth.

In certain aspects, the wire of each electrode is disposed along the convex outer surface. Where the device includes a plurality of electrode pairs, they may be disposed along the convex outer surface. In certain aspects, the distal tip includes a plurality of rounded protrusions extending from the exterior surface of the distal end, and the wire of each electrode may be disposed along an outer surface of one of the rounded protrusions. Similarly, when the distal tip includes a plurality of electrode pairs and a plurality of rounded protrusions extending from the exterior surface of the distal end, the wires of each different electrode pair may be disposed along an outer surface of a different protrusion.

By bending wires along the convex rounded surface or the rounded protrusions, rounded electrodes are formed at the distal end of the device. The devices can emit RF energy along the length of the wire electrodes to provide a broad and/or specifically shaped treatment surface. The broad/shaped treatment surface allows for not only quickly treating a large tissue surface, but also for quickly and specifically treating tissue surfaces of complex shapes, such as curved tissue surfaces or tissue cavity spaces. Moreover, the rounded shape of the electrodes allows for them to pass relatively easily through a tortuous anatomy while also providing a higher current density than other electrode configurations.

Alternatively, in certain devices of the disclosure, the distal end of the distal tip comprises a substantially planar exterior surface. In such devices, each electrode may comprise a substantially flat surface facing distally from the distal end (i.e., towards a target tissue surface).

In certain devices of the disclosure, articulating the switch in a manner that stops the flow of fluid from both fluid sources mechanically interrupts a flow of RF energy to the electrodes. In certain aspects, the control switch is operably connected to a three-way stopcock. The control switch may be connected to the stopcock via stepper motor that advances movement of the stopcock. Alternatively, the control switch is a three-way switch operably connected to a plurality of roller clamps. Articulating the control switch causes the roller clamps to clamp or release a fluid line in fluid connection with one of the fluid sources and the lumen of the handle.

In certain aspects, the distal tip includes a plurality of fluid ports, each configured to distribute fluid to an exterior surface of the distal tip, and wherein said fluid ports are in fluid communication with an interior space of the distal tip. Alternatively or additionally, the distal tip includes one or more suction ports that suck fluid from the exterior of the distal tip into an interior space of the shaft. Alternatively or additionally, the distal tip comprises one or more irrigation ports to provide irrigation fluid.

Certain devices of the invention may also include one or more light sources on the distal tip. The light sources may be on the exterior surface of the distal end of the distal tip.

In certain aspects, the devices of the invention include a shaft that comprises a non-conductive polymer jacket. The non-conductive polymer jacket may comprise, for example, a 50-70 durometer polymer. In certain aspects, the shaft comprises a composite material. The composite material may include fibers set within a thermoset matrix.

In certain aspects, the device is operable to measure impedance and/or temperature.

The invention further provides a medical device that includes: a handle; a shaft extending distally from the handle, said shaft comprising a distal tip, wherein the distal tip comprises at least one pair of electrodes on an exterior surface of a distal end of the distal tip; at least one fluid port configured to distribute fluid to an exterior surface of the distal tip, wherein said fluid port is in fluid communication with a lumen in the handle; and a control switch, wherein articulating the control switch prevents fluid from flowing into the lumen from a first and second fluid source and mechanically interrupts a flow of RF energy to the electrodes.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DESCRIPTION

Figure 1:
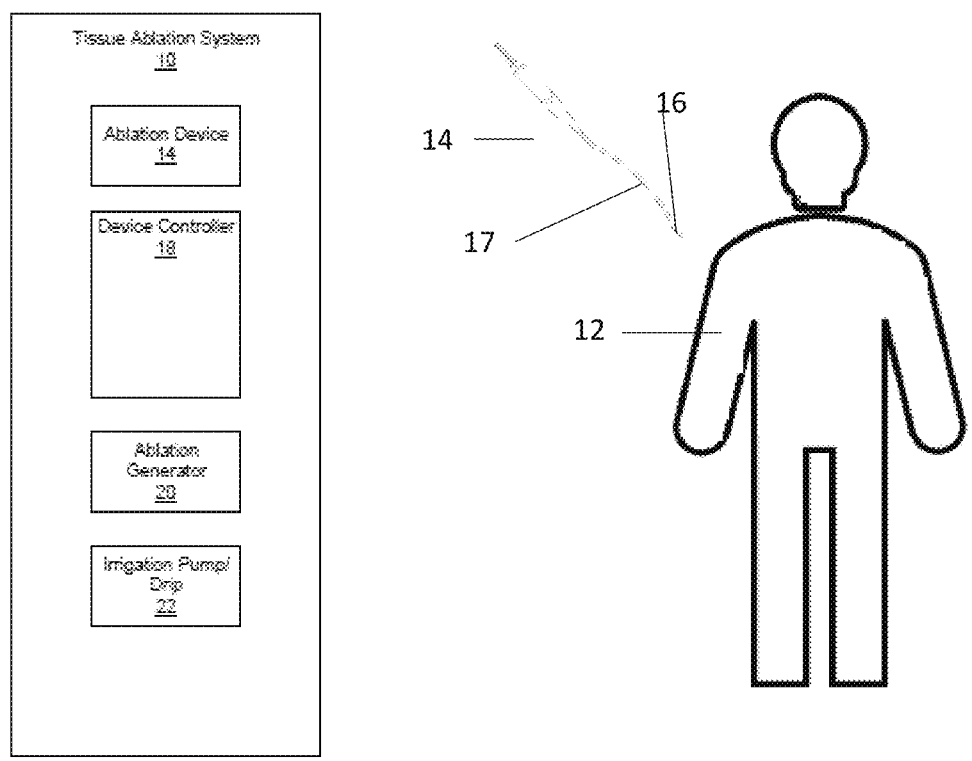
FIG. 1 is a schematic illustration of an ablation system consistent with the present disclosure.

The present disclosure is generally directed to a tissue ablation system including an ablation device to be delivered to a target site to achieve coagulation of tissue.

The presently disclosed ablation devices include a handle connected to a shaft, the distal end of which includes electrodes for delivering radiofrequency (RF) energy. The handle allows a medical professional to manually manipulate the distal end of the device.

In certain devices of the invention, the shaft is bendable and resilient, and made from a non-conductive material, such as a polymer. Because the shaft is bendable, it can contort around tortuous anatomy as it is inserted into a treatment site. However, because the shaft is concurrently resilient, it resists axial compression (i.e., in the direction from the distal tip to the handle) and lateral compression. Thus, the shaft possesses an inherent stiffness such that a force axial to the handle and shaft can be applied to firmly position the electrodes at the tip-to-tissue interface. This allows the ablation device to precisely apply RF energy to a desired location and/or provide sufficient mechanical force to assist in a particular procedure, e.g., to perforate or cut a tissue. Moreover, being resilient, rather than malleable like a shaft made from a metal, the shaft returns to its original shape, e.g., protruding axially from the handle. Thus, if the device encounters an obstacle during insertion, it will not be irretrievably deflected from a target site.

A tissue ablation system consistent with the present disclosure may be well suited for treating precise areas of tissue, particularly during minimally-invasive surgical procedures and/or robot-assisted surgical procedures. Accordingly, the ablation device of the present invention may be particularly useful during procedures involving the removal of unhealthy, or otherwise undesired, tissue from any part of the body. Thus, tumors, both benign and malignant, may be removed via a surgical intervention and the ablation devices described herein can be used to coagulate the tissue and enhance the margin of the resection site.

In particular, the present disclosure is generally directed to a surface tissue ablation system, including an ablation device to be delivered to the surface of a target tissue where it emits non-ionizing radiation, such as radiofrequency (RF) energy. The tissue ablation device of the present disclosure is configured to allow surgeons, or other medical professionals, to deliver controlled doses of RF energy at consistent depths to precise areas of tissue to provide, for example, coagulation in a quick and efficient manner.

In other aspects, a tissue ablation system consistent with the present disclosure may also be well suited for treating hollow body cavities, such as irregularly-shaped cavities in breast tissue created by a lumpectomy procedure. For example, once a tumor has been removed, a tissue cavity remains. The tissue surrounding this cavity is the location within a patient where a reoccurrence of the tumor may most likely occur. Consequently, after a tumor has been removed, it is desirable to destroy the surrounding tissue (also referred herein as the "margin tissue" or "marginal tissue"). The devices of the present disclosure can effectively navigate a tortuous anatomy and be positioned and repositioned at target regions of tissue. Thus, the devices of the invention can be used to ablate complex, and irregularly shaped tissues, such as tissue cavities created by a lumpectomy.

The tissue ablation system of the present disclosure can be used during an ablation procedure to destroy the thin rim of tissue in a targeted manner. In particular, the present disclosure is generally directed to a cavitary tissue ablation system including an ablation device to be delivered to a target tissue and configured to emit non-ionizing radiation, such as radiofrequency (RF) energy, in a desired shape or pattern so as to deliver treatment for the ablation and destruction of the targeted tissue.

The tissue ablation device of the present invention generally includes a non-conductive, elongated shaft attached to a handle and adapted for manual manipulation. The non-conductive shaft includes a distal tip with one or more electrodes disposed on an external surface thereof. The distal tip, including the electrodes, can be delivered to and maneuvered within a patient's body and configured to ablate tissue (via RF energy) at a precise location in order to, for example, coagulate the tissue and/or destroy marginal tissue to minimize recurrence of a tumor. The tissue ablation devices of the present disclosure are configured to allow surgeons, or other medical professionals, to deliver precise, measured doses of RF energy at controlled depths to tissue surrounding a specific target site.

Accordingly, a tissue ablation device consistent with the present disclosure may be well suited for treating hollow body cavities, such as irregularly-shaped cavities created by tumor removal. It should be noted, however, that the devices of the present disclosure are not limited to such post-surgical treatments and, as used herein, the phrase "body cavity" may include non-surgically created cavities, such as natural body cavities and passages, such as the ureter (e.g. for prostate treatment), the uterus (e.g. for uterine ablation or fibroid treatment), fallopian tubes (e.g. for sterilization), and the like. Additionally, or alternatively, tissue ablation devices of the present disclosure may be used for the ablation of tissue in various parts of the body and organs (e.g., skin, lungs, liver, pancreas, etc.).

FIG. 1 is a schematic illustration of an ablation system 10 for providing targeted ablation of tissue during a minimally-invasive procedure in a patient 12. The ablation system 10 includes an ablation device 14, which has a bendable and resilient shaft 17, to which the distal tip 16 is connected. The shaft 17 is made from a non-conductive material, such as a plastic or other polymer.

The ablation device 14 may further be coupled to a device controller 18 and an ablation generator 20 over an electrical connection, and an irrigation pump or drip 22 over a fluid connection. Preferably, the irrigation pump or drip 22 includes two or more fluid sources, from which a single control can be used to choose the source from which fluid is provided to the device.

As will be described in greater detail herein, the device controller 18 may be used to control the emission of energy from one or more conductive members (i.e., electrodes) of the device 14 to result in ablation. The device controller 18 may also control the delivery of fluid to the distal tip of the device so as to control subsequent weeping of fluid from the device during an RF ablation procedure. Preferably, the device controller includes a single control or switch on the handle of the device that can be used to activate fluid flow, choose the fluid source, and activate ablative energy flow to the electrodes.

As will be described in greater detail herein, during an ablation treatment, the ablation generator 20 may provide RF energy (e.g., electrical energy in the radiofrequency (RF) range (e.g., 350-800 kHz)) to the electrodes of the ablation device 14. The generation and transmission of this energy can be controlled in whole or in part by the device controller 18. The flow of RF energy to the electrodes may be controlled using a single control or switch on the handle. Preferably, the switch includes a means to mechanically interrupt the flow of RF energy to the electrodes when the switch is set to prevent the flow of fluid from the device. Concurrently, when the switch is articulated such that fluid flows from one of the fluid sources through the device, RF energy may flow to the electrodes for ablation.

In certain aspects, the RF energy is transmitted by one or more supply electrodes on the device, through a conductive fluid provided from a fluid source, through the blood and tissue of the patient 12, and then to one or more return electrodes. In the process, the RF energy ablates the region(s) of tissues adjacent to the electrodes on the distal tip.

Figure 2:
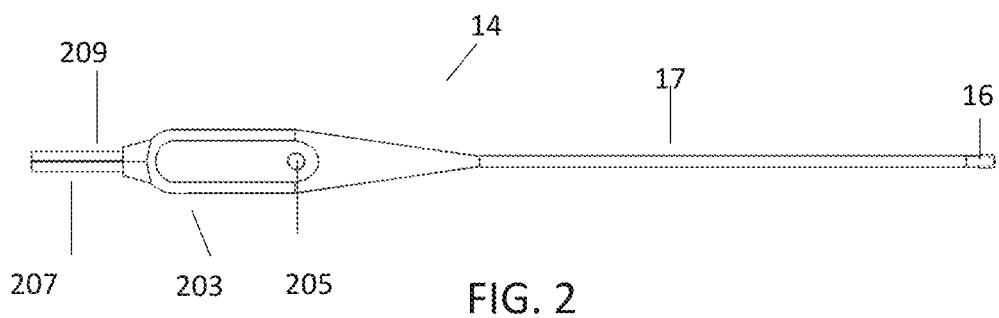
FIG. 2 is a perspective schematic of an exemplary ablation device of the invention.

FIG. 2 is a perspective view of the ablation device 14. As shown, the device includes a handle 203 from which the bendable and resilient shaft 17 extends. In preferred aspects, the handle includes a single control/switch 205 that can be used to activate/deactivate fluid flow, choose the fluid source, and activate/deactivate ablative energy flow to the electrodes.

Figure 3:
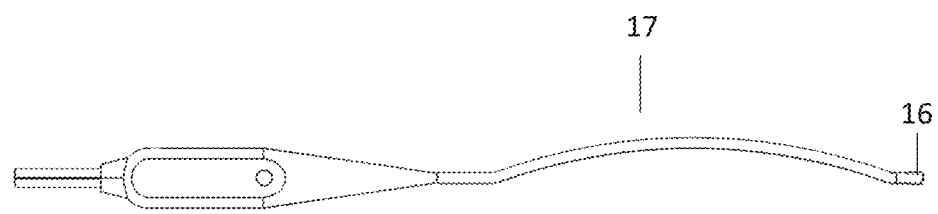
FIG. 3 is a perspective schematic of an exemplary ablation device of the invention.

As shown in FIG. 3, the shaft is bendable and thus able to contort around tortuous anatomy as it is inserted into a treatment site. However, because the shaft is concurrently resilient, it resists axial compression (i.e., in the direction from the distal top to the handle) and lateral compression. Thus, the shaft possesses an inherent stiffness such that a force axial to the handle and shaft can be applied to firmly position the electrodes at the tip-to-tissue interface. This allows the ablation device to precisely apply RF energy to a desired location and/or provide sufficient mechanical force to assist in a particular procedure, e.g., to perforate or cut a tissue. Moreover, being resilient, rather than malleable like a shaft made from a metal, the shaft returns to its original shape, e.g., protruding axially from the handle. Thus, if the device encounters an obstacle during insertion, it will not be irretrievably deflected from a target site.

The shaft is made using a non-conductive material (e.g., a plastic or polyamide) as a layer on at least a portion of an internal surface, an external surface, or both an external and internal surface. In certain aspects, the shaft includes a polymer jacket. Preferably, the polymer jacket is made from a 50-70 durometer polymer. Additionally or alternatively, the shaft material can include an elastomeric material or a shape memory material. The shaft/distal tip, or selected portions thereof, can be made using, or include a coating made from, a flexible or elastomeric material, such as a pliable polymer, biocompatible rubber thermoplastic elastomer, or PVC. In certain aspects, the shaft/distal tip, or selected portions thereof, can be made of a more rigid material covered with an elastomeric or flexible material covering it.

In certain aspects, the shaft is made from or using one or more composite materials. In certain aspects, the shaft is made from or using fibers set within a thermoset matrix. In certain aspects, the shaft is made using two or more different fibers. Different fibers may be used that are differently compliant, and thus each contribute differently to the relative resilience of the shaft. The fibers may be non-woven fibers. The fiber matrix can be produced using a variety of techniques, e.g., electrospinning or melt-bending.

In certain aspects, one or more components of the device, such as the shaft, is made using additive manufacturing, e.g., three-dimensional printing.

In certain devices the non-conductive shaft is malleable or partially malleable and/or includes malleable or partially malleable portions. A malleable or partially malleable shaft/shaft portion can be bent when subjected to a force and retain all or some of the bend upon removal of the force.

In certain aspects, the shaft 17 and/or the distal tip 16 of the shaft have a diameter of between about 1 mm and 50 mm. In certain implementations, the shaft and/or the distal tip have a diameter of less than 2.0 mm, less than 5 mm, less than 10 mm, less than 12 mm, less than 16 mm, less than 25 mm, less than 30 mm, less than 35 mm, less than 40 mm, or less than 50 mm. In certain aspects, the shaft and/or distal tip is tapered such that the diameter of the shaft/distal tip is reduced as it extends distally from the handle.

The handle 203 may also include a fluid port and/or fluid line 209, which is in fluidic communication with a lumen in the handle and can be connected to a fluid source as described herein. The handle 203 may also include a cable 207 and/or connector that can be operably connected to an ablation generator, which provides the necessary RF energy to the device in order to ablate tissue.

Figure 6:
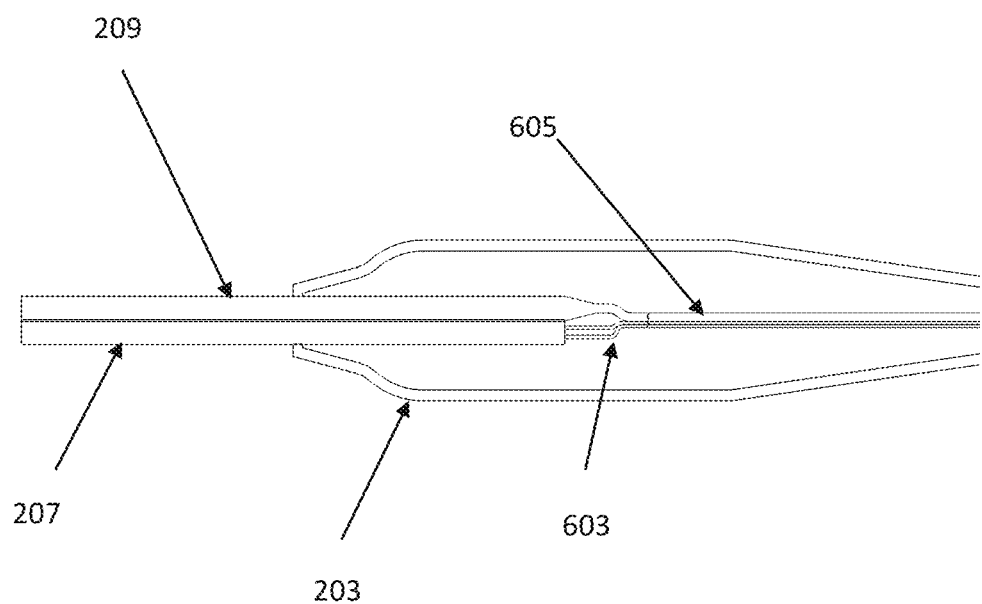
FIG. 6 shows a cutaway schematic of an exemplary handle.

As shown in FIG. 6, the cable 207 is connected inside the handle to power leads 603, which are in turn connected to the electrodes on the distal tip of the device.

Figure 4:
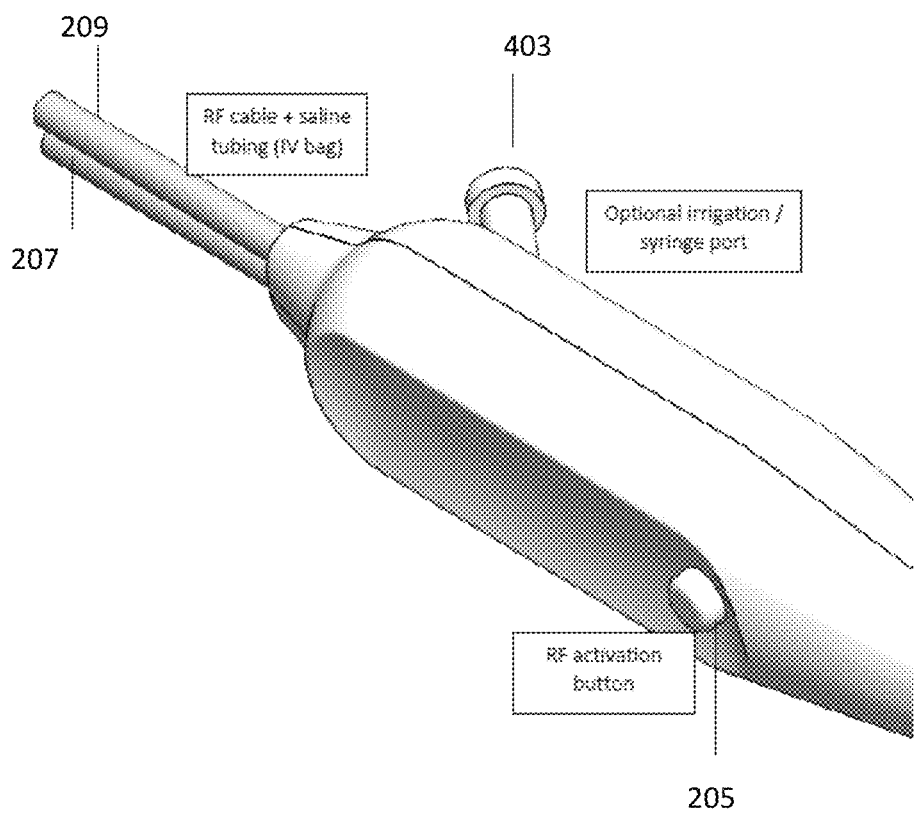
FIG. 4 shows a schematic of an exemplary handle of an ablation device of the invention.
Figure 5:
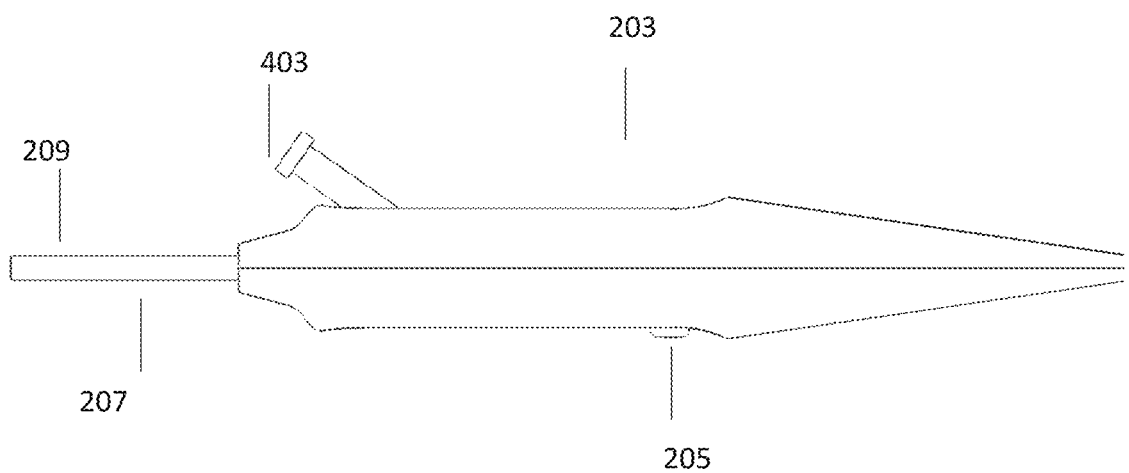
FIG. 5 shows a schematic of an exemplary handle of an ablation device of the invention.

As shown in FIGS. 4-6, the handle 203 can also include a second fluid port 403, which is in fluidic communication with the lumen in the handle (shown as component 605 in FIG. 6) and can be connected to a fluid source. The fluid port and/or fluid line 209 and the second fluid port 403 are preferably in fluidic communication with different fluid sources. For example, as shown in FIG. 4, the fluid port and/or fluid line 209 is connected to an IV bag to deliver saline to the device, while the second fluid port 403 is connected to a syringe or syringe pump. In certain aspects, fluid can be driven through the fluid line 209 and/or the second fluid port 403 using the irrigation pump 22.

In certain aspects, the device 14 and system 10 are configured to provide RF energy ablation via a virtual electrode arrangement, which includes distribution of fluid along an exterior surface of the distal tip. When RF energy is provided to the electrodes, the fluid may carry, or otherwise promote, energy emitted from the electrodes into the surrounding tissue. Fluid from one of the fluid sources can be delivered to the lumen in the handle and flow to an interior chamber in the shaft. The fluid can then weep or flow through ports on the distal tip. This creates a pool or thin film of fluid on the exterior surface of the distal tip, which transmits the RF energy to ablate surrounding tissue. By using a virtual electrode arrangement, the presently disclosed devices and systems can provide ablative energy deeper into target tissue than other contemporary ablation techniques.

In certain aspects, one or more of the fluid sources provides a conductive/ionic fluid, such as saline, to the device. The conductive fluid transmits RF energy from the electrodes to a target tissue. A continual flow of the conductive fluid can also serve to regulate the temperature of the electrodes and/or prevent the electrodes from directly contacting the target tissue. In certain procedures, direct electrode contact or sufficiently high electrode temperature can char the target tissue. Not only can this cause detrimental effects to the patient, but it can also cause blood or other biological components to scorch against the device, which can clog the fluid ports or interfere with the electrodes.

In certain aspects, the fluid sources may include a first fluid source and a second fluid source. The first and second fluid sources may respectively provide a first and second fluid to the device. The first fluid may, for example, be a conductive fluid through which RF energy passes from the electrodes to the targeted tissue. Concurrently, the second fluid may be a conductive fluid or a non-conductive fluid. In certain aspects, the fluids are the same fluid. The fluids may be provided to the device at different temperatures. For example, one fluid can be of a lower temperature to provide on-demand cooling when required to maintain an ideal electrode temperature. In certain aspects, the fluids are different.

In certain aspects, the first fluid is a conductive fluid (e.g., saline) while the second fluid includes a therapeutic agent, such as one or more drug, therapeutic, pain blocker, chemotherapy, anti-inflammatory agent, clotting agent, and the like. Advantageously, because the device can include fluidic connections to separate fluid sources, both conductive fluid and, for example, a therapeutic can be selectively provided during a procedure, without removing the device from the surgical site.

Figure 7:
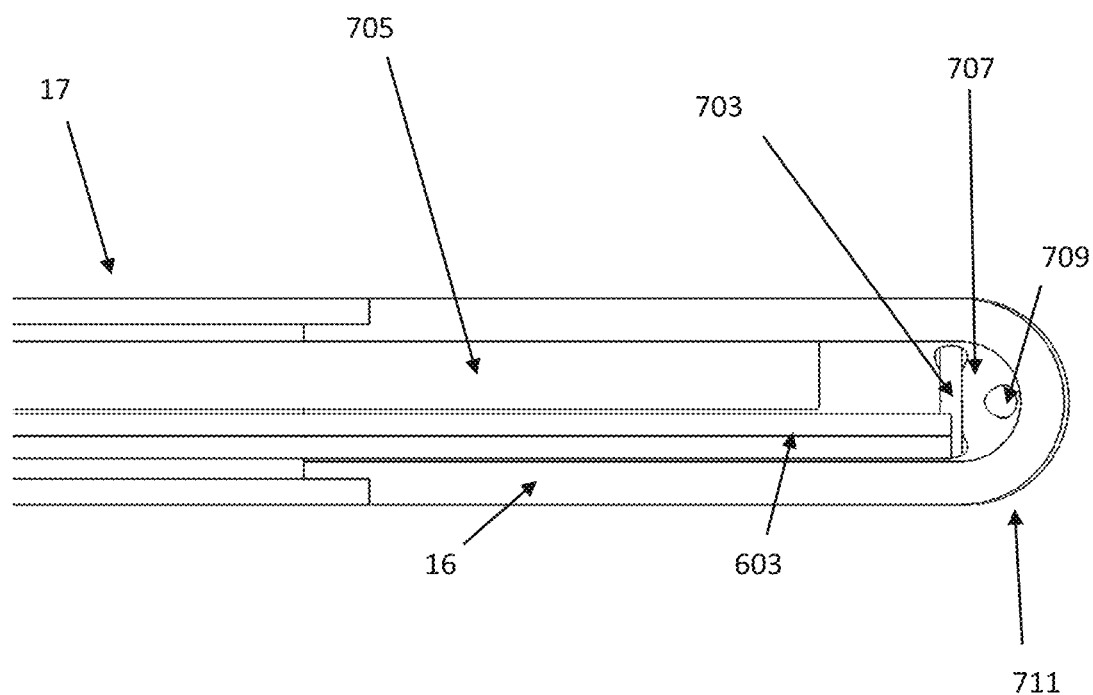
FIG. 7 shows a cutaway schematic of an exemplary distal shaft and distal tip of an ablation device.

FIG. 7 provides a cutaway view of an exemplary shaft 17 and distal tip 16. The shaft 17 includes an internal tube 705, which is fluidic communication with the lumen of the handle. Liquid from the fluid sources may flow from the lumen, through the internal tube 705, and into an interior space 707 at the distal end 711 of the distal tip 16. The fluid can pass through one or more fluid ports 709, and weep to the exterior surface of the distal tip. The distal end 711 of the distal tip 16 also includes one or more electrodes or electrode pairs 703, which are connected to power leads 603.

Each electrode includes at least one conductive member. The presently disclosed devices can include different numbers of electrodes and conductive members. These conductive members transmit RF energy from the ablation generator and can be formed of any suitable conductive material (e.g., a metal such as stainless steel, nitinol, or aluminum).

In certain aspects, as shown in FIGS. 8-12, the conductive members are conductive wires. As illustrated, in FIG. 8, the conductive wires 805,807 can be electrically isolated. This electrical isolation enables various operation modes for the ablation device 14. For example, ablation energy may be supplied to one or more conductive wires in a bipolar mode, a unipolar mode, or a combination bipolar and unipolar mode. In the unipolar mode, ablation energy is delivered from one or more conductive wires (a supply channel/electrode) and to one or more different conductive wires (a return channel/electrode). In bipolar mode, energy is delivered between at least two of the conductive wires, while at least one conductive wire remains neutral. In other words, at least, one conductive wire functions as a grounded conductive wire (e.g., electrode) by not delivering energy over at least one conductive wire.

Figure 8:
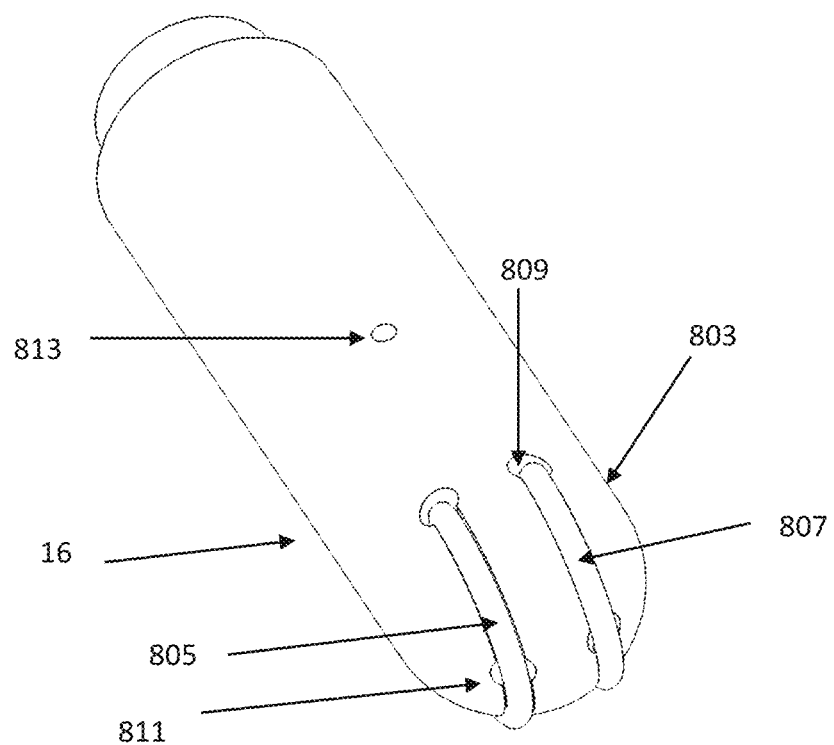
FIG. 8 provides a schematic of an exemplary distal tip.
Figure 12:
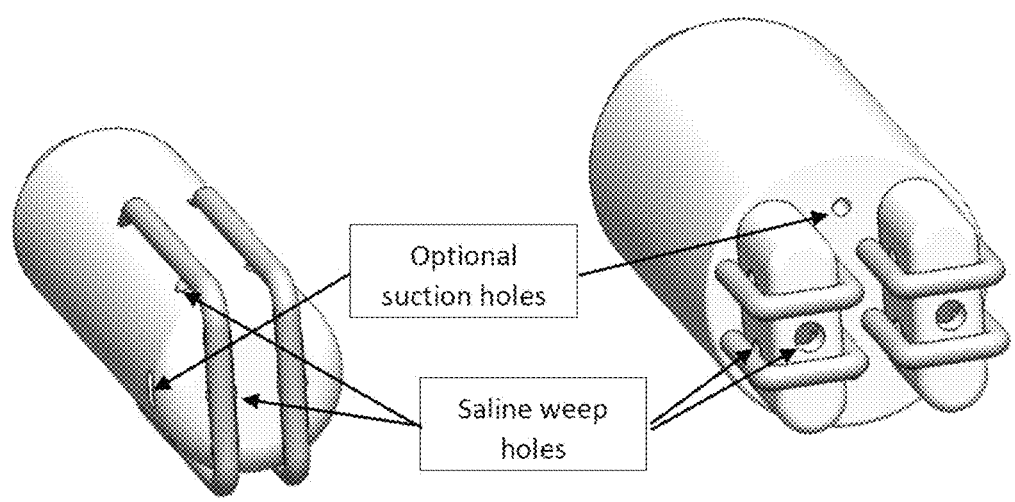
FIG. 12 provides illustrations of exemplary distal tips.

As shown in FIGS. 8 and 12, the distal end 803 of the distal shaft 16 may include a convex outer surface with a hemi-elliptical or hemi-ovoidal shape. This shape can provide a rounded, atraumatic tip that can easily pass through a tortuous anatomy. Moreover, as the tip is rounded, it can provide a smaller and more precise tip-to-tissue interface. The distal tip 16 also includes one or more fluid ports 811 for providing fluid from the fluid sources. In certain aspects, the distal tip also includes one or more suction ports 813.

In certain aspects, the conductive wires of the electrodes 805,807 are disposed along the surface of the distal end 803 of the distal tip 16. In certain aspects, the wires extend from within the distal tip 16, through a channel 809 and along an external surface of the distal end. In some examples, each conductive wire can extend through a different channel 809, which allows the conductive wires to remain electrically isolated from one another. In other examples, one or more conductive wires can extend through the same channel 809.

The conductive wires may extend along a longitudinal length of the distal tip 16. The wires may be radially spaced apart (e.g., equidistantly spaced apart) from each other.

As shown in FIG. 8, because the electrode wires 807,805 wrap around the rounded, convex surface of the distal end 803, the wires are themselves curved. By bending wires along the convex rounded surface or the rounded protrusions, rounded electrodes are formed at the distal end 803 of the device. The device can emit RF energy along the length of the wire electrodes to provide a broader treatment surface. Moreover, the rounded shape of the electrodes allows for them to pass relatively easily through a tortuous anatomy while also providing a higher current density than other electrode configurations.

In certain aspects, the electrode wires 807,805 are part of an electrode pair. Thus, for example, 807 can be a supply electrode while 805 is a return electrode.

As shown in FIGS. 9-12, the distal end of the distal tip can include a planar surface 903 on which one or more rounded shapes are disposed. The conductive wires of the electrodes can be disposed along the surface of the shapes to provide rounded electrodes. As also shown in FIGS. 9-12, the rounded shapes can take a variety of forms and sizes as can the electrode wire arrangement.

Figure 9:
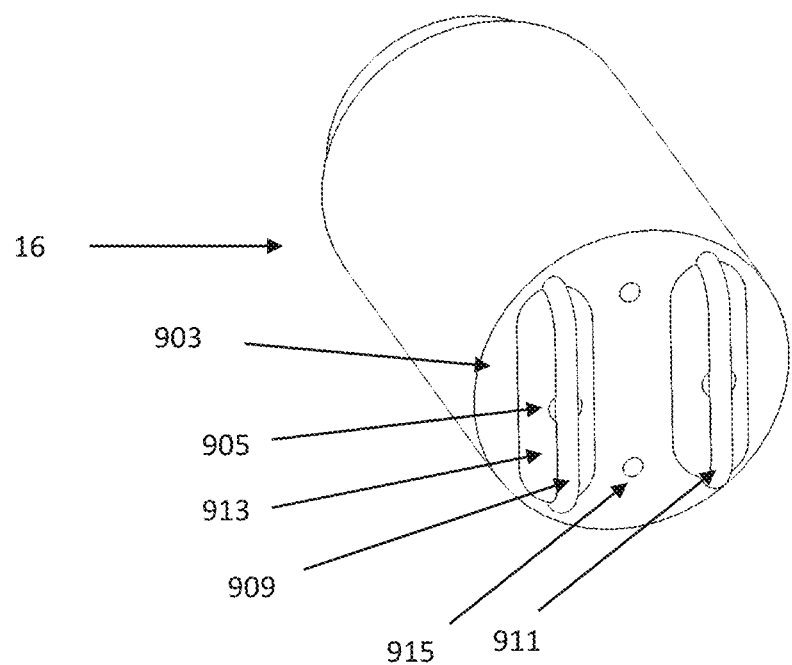
FIG. 9 provides a schematic of an exemplary distal tip.

As shown in FIG. 9, in certain aspects, each rounded shape 913 has a single wire 909,911 of an electrode disposed along its surface. Each electrode may be one electrode of an electrode pair. The shapes 913 and/or the planar surface 903 can include one or more fluid or suction ports 905,915.

Figure 10:
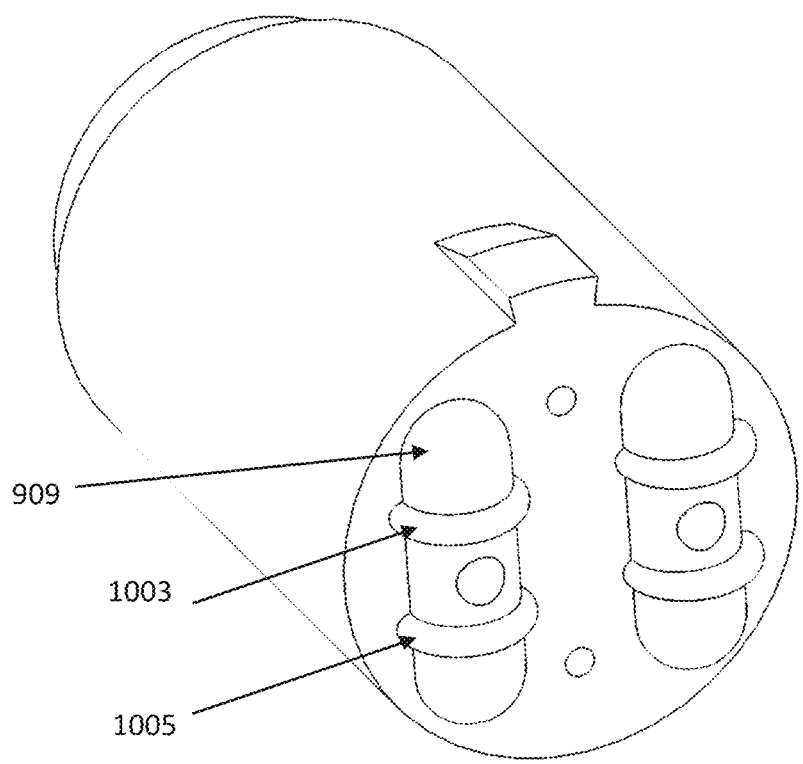
FIG. 10 provides a schematic of an exemplary distal tip.

As shown in FIG. 10, each shape 913 can include a plurality of electrode wires 1003,1005 disposed along its surface. Preferably, both electrode wires of an electrode pair (a positive and a negative channel) are found on a single one of the rounded shapes.

Figure 11:
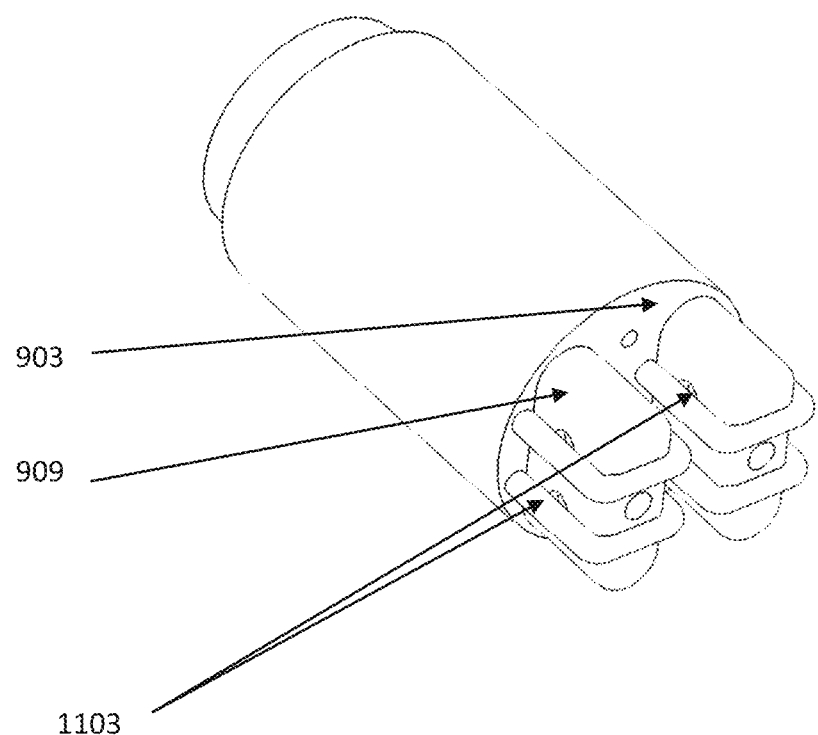
FIG. 11 provides a schematic of an exemplary distal tip.

As shown in FIG. 11, in certain aspects, the rounded shapes 913 can protrude from the planar surface 903 of the distal end. Thus, the rounded electrodes can form prongs that extend distally from the distal tip. Because the rounded shapes 913 protrude, they include space on their lateral surfaces in which one or more fluid/suction ports 1103 can be placed.

Figure 13:
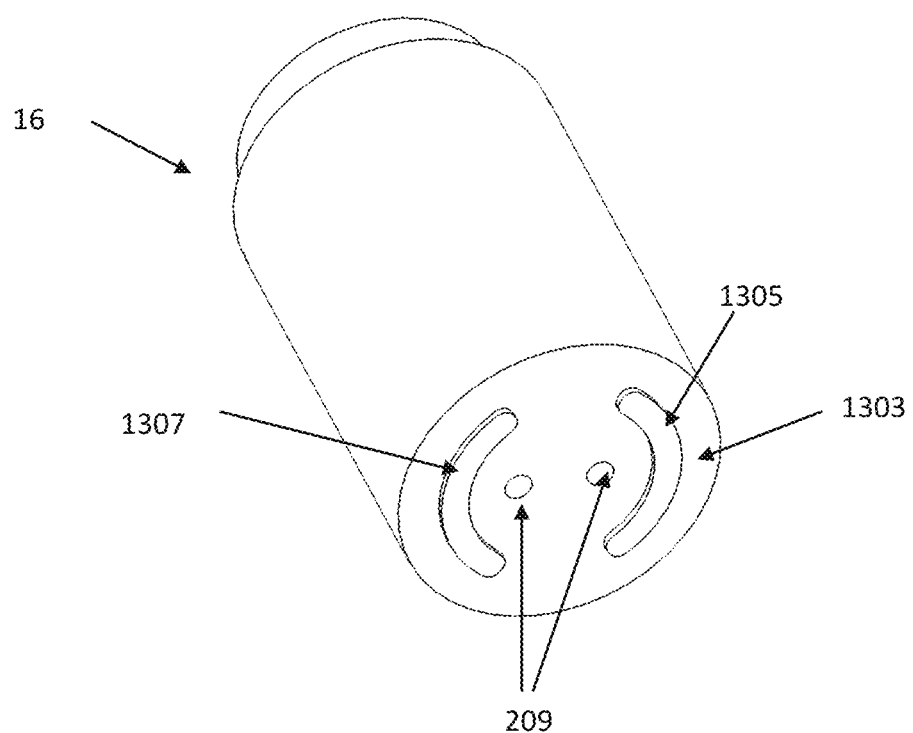
FIG. 13 provides a schematic of an exemplary distal tip.
Figure 14:
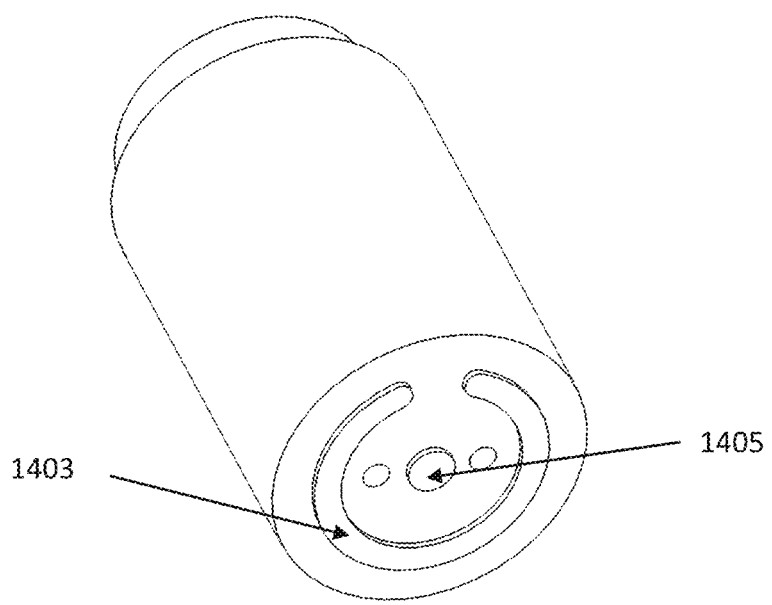
FIG. 14 provides a schematic of an exemplary distal tip.
Figure 15:
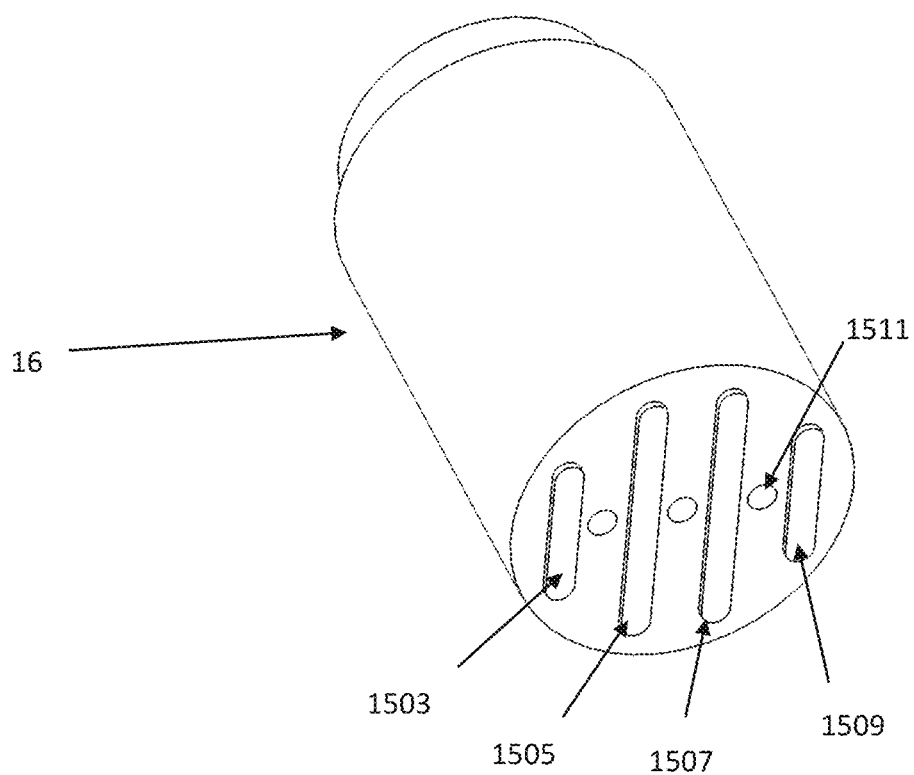
FIG. 15 provides a schematic of an exemplary distal tip.

In certain aspects, as shown in FIGS. 13-15, the distal tip 16 includes a distal end with a substantially planar surface 1303 on which the conductive members of the electrodes are disposed. As shown in FIG. 13, in certain aspects, the conductive members 1305,1307 are flat relative to the planar surface 1303. The conductive elements may be flush with the planar surface, protrude from the planar surface, or be recessed from the planar surface.

As shown in FIGS. 13-15, the conductive members can be of a variety of shapes and sizes. For example, in FIG. 13, the supply conductive member 1305 and return conductive member 1307 have a crescent shape. As shown in FIG. 14, the conductive members of an electrode pair (i.e., a supply and return electrode) can have different shapes.

As shown in FIG. 15, in certain aspects, the distal tip 16 includes a plurality of electrode pairs. For example, conductive member 1503 and 1505 can form an electrode pair while electrode 1507 and 1509 form a second electrode pair.

As shown in FIGS. 8-15, the distal end of the shaft can include one or more fluid ports to provide, for example, the conductive fluid. As shown in FIGS. 12 and 15 (component 1511), in certain aspects, the number of fluid ports may increase in proportion to the number of electrode pairs used.

In certain aspects, as shown in FIG. 12, the distal tip includes one or more suction ports or holes. The suction ports are in fluid communication with a suction conduit that extends through the shaft and handle and with a suction source such as a port in an operating room. The suction ports can be used, for example, to remove excess conductive fluid during a procedure. In certain aspects, a suction force provided by the ports is used to secure the tip-to-tissue interface, thereby preventing the device from inadvertently moving during a procedure.

Figure 16:
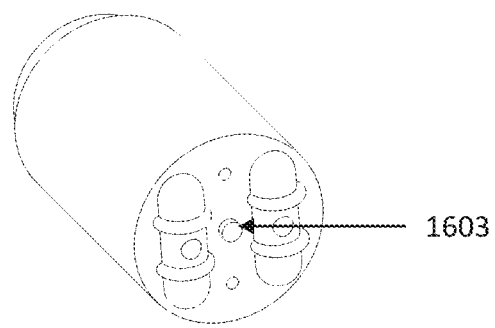
FIG. 16 shows an exemplary illumination source disposed on a distal tip.
Figure 17:
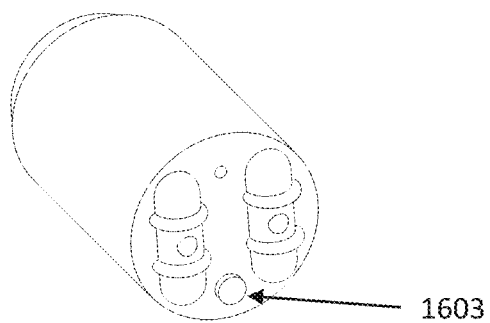
FIG. 17 shows an exemplary illumination source disposed on a distal tip.
Figure 18:
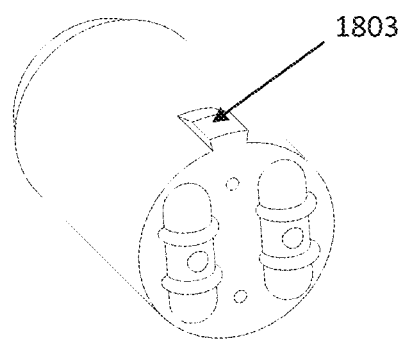
FIG. 18 shows an exemplary illumination source disposed on a distal tip.

In certain aspects, the distal tip of the device can include additional components, such as illumination sources, e.g., light emitting diodes. As shown in FIGS. 16-17, the distal tip can include one or more light sources 1603 distributed on the distal end of the distal tip. Alternatively or additionally, the distal tip can include one or more light sources 1803 on a lateral surface.

The presently disclosed devices may employ more than one fluid source to provide the fluid. In certain aspects, the device includes a switch on the device that can be used to activate the flow of fluid and switch between fluid sources providing the fluid. Moreover, in certain aspects, the same switch can include a means, such as a mechanical linkage, which interrupts the flow of RF energy to the electrodes absent a flow of fluid through the device. By preventing the flow of RF energy in the absence of fluid, the presently disclosed devices may reduce injury or complications, such as thrombus and char formation, which result from excessive heating of the tissue at the tip-to-tissue interface.

Thus, in certain aspects, the device includes a single control or switch on the handle of the device that can be used to activate fluid flow, choose the fluid source, and activate ablative energy flow to the electrodes. As such, a medical professional performing a procedure using a device of the present disclosure, can activate/deactivate RF energy and conductive fluid flow and switch the fluid source delivering the fluid with a single hand, and without removing the device from the target tissue.

Figure 19:
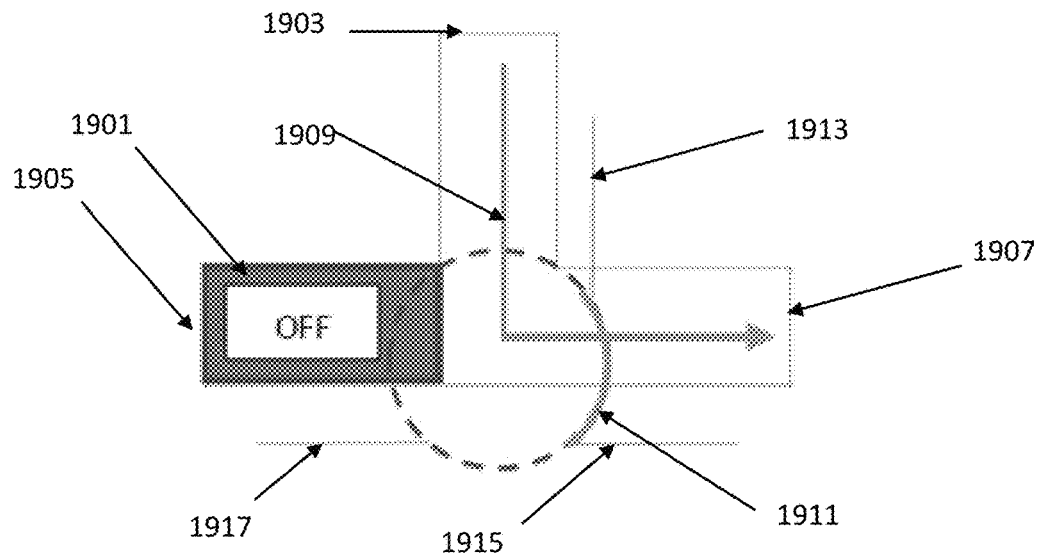
FIGS. 19-22 provide a schematic of a stopcock as used in an ablation device of the current invention.

In certain aspects, the control/switch controls or is a part of a stopcock. FIG. 19 provides a schematic of an exemplary three-way stopcock used in the devices of the invention. The stopcock includes a rotating valve 1901, a fluidic connection 1903 to the first fluid source (e.g., the fluid port or line 209 in FIG. 2), and a fluidic connection 1905 to the second fluid source (e.g., fluid port 403 in FIG. 4). Both fluidic connections 1903,1905 can be provided with a fluidic connection to the lumen 1907 of the handle through the stopcock.

In certain aspects, the handle of the device includes a control that is mechanically linked to the stopcock in order to rotate the valve. In certain aspects, the handle of the device includes a control or switch that activates a stepping motor, which rotates the stopcock valve.

As shown in FIG. 19, when the stopcock is in a first position, the valve blocks the fluidic connection 1905 from the second fluid source. Concurrently, the stopcock provides an open flow path for fluidic connection 1903, which fluidically connects the first fluid source to the lumen connection 1907. Thus, fluid from the first fluid source 1909 can flow into the lumen of the handle, through the shaft, and out one or more fluid ports on the distal end of the shaft.

In certain aspects, the switch and/or stopcock includes a mechanical component 1911. Rotating the stopcock may concurrently move this component 1911 such that it contacts leads or wires 1913 and 1915. In doing so, the component may complete a circuit between leads/wires 1913 and 1915, which allows RF energy to flow from the ablation generator to the electrodes at the distal end of the device. Advantageously, in this first setting, RF energy is only provided to the electrodes when fluid is flowing through the device.

Figure 20:
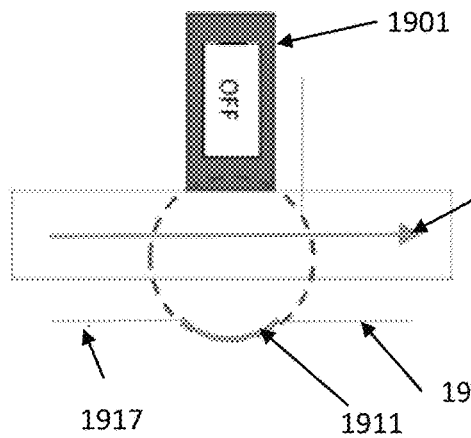
Figure 21:
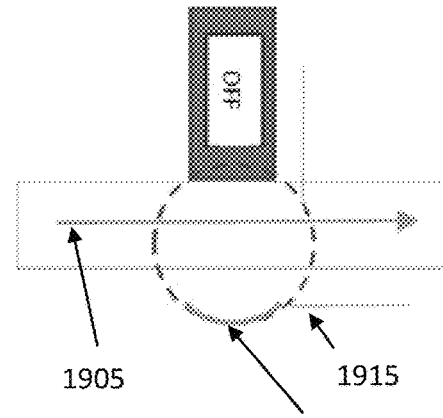

As shown in FIGS. 20-21, in certain aspects, when the stopcock is advanced to a second position, the valve 1901 blocks the fluidic connection to the first fluid source. Concurrently, the stopcock provides a path from the second fluid source to the lumen. In FIG. 20, when the stopcock rotates into the second position, mechanical component 1911 makes contact with wires/leads 1917 and 1915, which completes a circuit that causes RF energy to flow into the electrodes. Alternatively, as shown in FIG. 21, wire/lead 1917 can be omitted. Thus, when rotated to the second position, the stopcock allows fluid to flow from the second fluid source, but the RF energy flow is mechanically interrupted. This arrangement, for example, is used when the second fluid is a therapeutic or other fluid that is not intended to transmit RF energy to the tissue.

Figure 22:
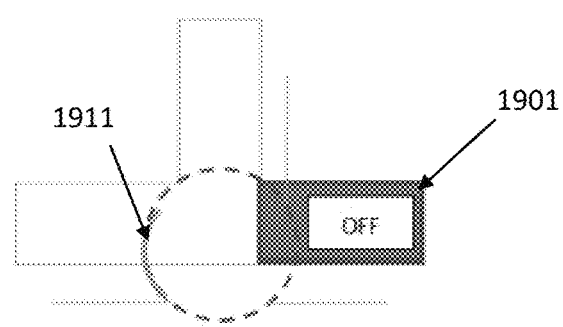

As shown in FIG. 22, when the stopcock is advanced to a third position, the valve 1901 prevents fluid from either fluid source from entering the lumen and flowing out through the fluid ports at the distal end of the device. In certain aspects, the mechanical component 1911 does not connect two leads/wires in this third position. Thus, advantageously, the RF energy does not flow to the electrodes in the absence of flowing fluid.

Also or alternatively, in certain aspects the stopcock can be advanced to a position wherein RF energy flow is interrupted and valve 1901 blocks the fluidic connection to the second fluid source and concurrently provides a path from the first fluid source to the lumen.

Also or alternatively, in certain aspects the stopcock can be advanced to a position wherein valve 1901 does not block a fluidic connection to either source such that a fluidic connection is made between the lumen and both fluid sources. In certain positions, when a fluidic connection is made to both fluid sources, RF energy flows to the electrodes. Also or alternatively, when a fluidic connection is made to both fluid sources, RF energy flow can be interrupted. Such settings can be used, for example, to provide a higher irrigation force or flow of fluid from the distal tip of the device. The increased irrigation may ensure, for example, that sufficient conductive fluid is present for ablation or that the temperatures during ablation do not increase to the extent that unintended thermal injury occurs.

In certain devices of the present invention, the stopcock can be advanced to two, three, four, five or more different positions that each produce a different combination of fluid and/or RF energy flow. In certain devices of the present invention, the stopcock is a two-, three-, four-, five-way stopcock.

Figure 23:
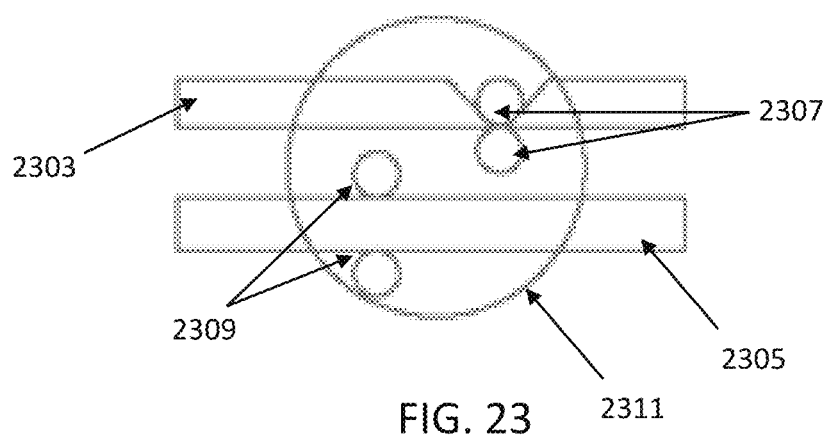
FIGS. 23-25 provide a schematic of clamp rollers as used in an ablation device of the current invention.
Figure 24:
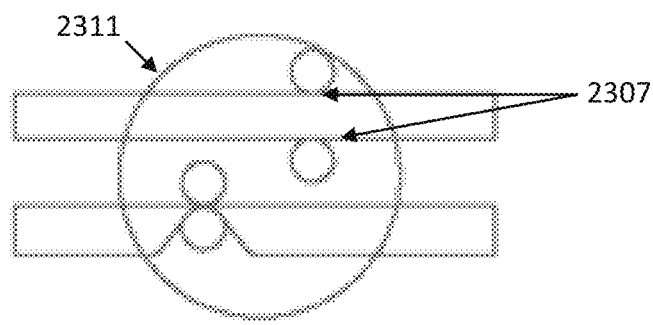
Figure 25:
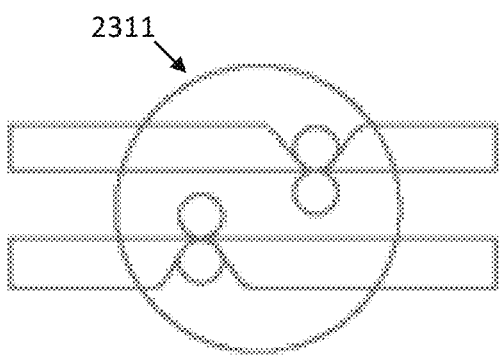

In certain aspects, the handle includes a switch that controls one or more roller clamps. FIGS. 23-25 show schematics of exemplary roller clamps used in the devices of the present disclosure. In the illustrated example, the control switch is a three-way control switch. However, switches that are two-, three-, four-, or five-way or more are contemplated within the present invention. In FIG. 23, a first tube 2303 is in fluidic connection with the first fluid source and the lumen of the handle, while a second tube 2305 is in fluidic connection with the second fluid source and the lumen.

As shown in FIG. 23, placing the switch in a first position causes elements of a first roller clamp 2307 to compress the first tube 2303, which prevents the flow of fluid from the first fluid source into the lumen. The elements of a second roller clamp 2309 remain open and allow fluid to flow from the second fluid source into the lumen.

In certain aspects, when the second roller clamp is open, a mechanical component, which can be a part of the roller clamp, can contact lead/wire 2311. This may complete a circuit and cause RF energy to flow to the electrodes of the device. Also or alternatively, in certain aspects placing the switch in a particular position causes the second roller clamp to open, while also interrupting RF energy flow to the electrodes.

As shown in FIG. 24, placing the switch in a second position causes the elements of the first roller clamp to open, allowing fluid to flow from the first fluid source into the lumen. Concurrently, the elements of the second roller clamp constrict the second tube, thereby preventing fluid from flowing into the device from the second fluid source. Opening the first roller clamp causes a mechanical component to contact lead/wire 2311, which allows RF energy flow to the electrodes.

As shown in FIG. 25, placing the switch in a third position causes the elements of both roller clamps to constrict both tubes, preventing any fluid flow into the device. In certain aspects, closing both roller clamps causes a mechanical interruption in the circuit between the electrodes and the RF energy generator. This assures that no RF energy flows in the absence of conductive fluid.

Also or alternatively, in certain aspects the switch can be advanced to a position wherein both the first and second roller clamps are open, thereby providing fluid flow to the lumen from both fluid sources. In certain positions, when a fluidic connection is made to both fluid sources, RF energy flows to the electrodes. Also or alternatively, when a fluidic connection is made to both fluid sources, RF energy flow can be interrupted. Such settings can be used, for example, to provide a higher irrigation force or flow of fluid from the distal tip of the device.

The control or switch may be a part of, or in communication with, the device controller 18. The device controller 18 may include hardware/software configured to provide a user with the ability to control electrical output from the ablation generator to the electrosurgical device 14 to the frequency or intensity of RF energy output to a wound site. For example, the ablation device may be configured using the device controller to operate at least in a "bipolar mode" based on input from a user (e.g., surgeon, clinician, etc.) resulting in the emission of radiofrequency (RF) energy in a bipolar configuration. The device controller can also be used to control the speed and volume at which fluid flows from the irrigation pump 22 to the device. In certain aspects, the irrigation pump 22 is fluidically connect to one or more of the fluid sources.

In some embodiments, the device 14 may be configured to operate in other modes, such as a "measurement mode", in which data can be collected, such as certain measurements (e.g., temperature, conductivity (impedance), etc.) that can be taken and further used by the controller 18 so as to provide an estimation of the state of tissue during a wound treatment procedure. Further still, the device controller 18 may include a custom ablation shaping (CAS) system configured to provide a user with custom ablation shaping, which includes the creation of custom, user-defined ablation geometries or profiles from the device 14. The CAS system may further be configured to provide ablation status mapping and ablation shaping based on real-time data collection (e.g., measurements) collected by the device.

In certain aspects, the conductive elements of the electrodes are electrically independent, and each conductive element can be connected in a fashion that allows for impedance measurements using bipolar impedance measurement circuits. Impedance measurements can be controlled and reviewed using the device controller 18. For example, the conductive wires can be configured in such a fashion that tetrapolar or guarded tetrapolar electrode configurations can be used. One pair of conductive wires could function as the current driver and the current return, while another pair of conductive wires could function as a voltage measurement pair. Accordingly, a dispersive ground pad can function as current return and voltage references. Their placement dictates the current paths and thus having multiple references can also benefit by providing additional paths for determining the ablation status of the tissue.

The features and functions of the controller 18 and CAS system are described in U.S. application Ser. No. 15/419,256, filed Jan. 30, 2017 (Publication No. 2017/0215951), U.S. application Ser. No. 15/419,269, filed Jan. 30, 2017 (Publication No. 2017/0215947), and application Ser. No. 15/902,398, filed Feb. 22, 2017, the contents of each of which are incorporated by reference herein in their entireties.

In certain aspects, the device controller 18 can provide a device status (e.g., RF energy on/off and, fluid delivery on/off) as well as one or more parameters associated with RF ablation (e.g., energy output, intensity and frequency, duration of energy flow, temperature, conductivity, fluid flow volume, etc.).

In certain aspects, the device controller 18 can be used to modify the properties of energy flow and/or fluid flow in the device. Nevertheless, in certain aspects, the device only provides the set energy and/or fluid flow to the device when the switch on the handle is appropriately manipulated.

The device controller 18 can also activate and/or control the suction force provided by the suction ports on the distal end of the device. The suction force can be activated or deactivated using a switch or button on the handle of the device. Alternatively, the suction force can be automatically activated by the flow of a fluid and/or energy through the device.

As used in any embodiment herein, the term "controller", "module", "subsystem", or the like, may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The controller or subsystem may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" "one aspect" or "an aspect" means that a particular feature, structure, or characteristic described in connection with the embodiment is included in at least one embodiment. Thus, appearances of the phrases "in one embodiment" or "in an embodiment" "one aspect" or "an aspect" in various places throughout this specification are not necessarily all referring to the same embodiment. Furthermore, the particular features, structures, or characteristics may be combined in any suitable manner in one or more embodiments.

Any references and citations to other documents (such as patents, patent applications, patent publications, journals, books, papers, and web contents) that may have been made within this disclosure are hereby incorporated herein by reference in their entirety for any and all purposes.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various modifications of the invention and many further embodiments thereof, in addition to those specifically shown and described herein, will become apparent to those skilled in the art from the full contents of this document, including any references to the scientific and patent literature cited herein. The subject matter herein contains important information, exemplification, and guidance that can be adapted to the practice of this invention in its various embodiments and equivalents thereof.

The invention claimed is:

1. A medical device, comprising:
    a handle;
    a bendable non-conductive shaft extending distally from the handle, said shaft comprising a distal tip, wherein the distal tip comprises at least one pair of electrodes on an exterior surface of a distal end of the distal tip;
    at least one fluid port configured to distribute fluid to an exterior surface of the distal tip, wherein said fluid port is in fluid communication with an interior space of the distal tip; and
    a control switch, wherein articulating the control switch causes fluid to flow from one of a plurality of fluid sources to the interior space and causes the electrodes to emit radio frequency energy,
    wherein the handle includes a lumen for receiving fluid from the fluid sources, wherein the lumen is in fluid communication with the interior space of the distal tip,
    wherein the plurality of fluid sources includes a first fluid source and a second fluid source,
    wherein the first fluid source provides a first fluid and the second fluid source provides a second fluid, wherein the first fluid is a conductive fluid, and
    wherein the first and second fluids are provided at different temperatures.

2. The medical device of claim 1 wherein bendable non-conductive shaft is resilient.

3. The medical device of claim 1 wherein the bendable non-conductive shaft is malleable or partially malleable.

4. The medical device of claim 1 wherein the second fluid is a conductive fluid.

5. The medical device of claim 1 wherein the second fluid is a non-conductive fluid.

6. The medical device of claim 1 wherein the first fluid source is an intravenous bag.

7. The medical device of claim 6 wherein the second fluid source is a syringe or syringe pump.

8. The medical device of claim 1 wherein each pair of electrodes includes a supply electrode and return electrode.

9. The medical device of claim 8 wherein each electrode comprises an isolated wire disposed on the exterior surface of the distal end.

10. The medical device of claim 9 wherein the distal end has a convex outer surface with a hemi-elliptical or hemi-ovoidal shape.

11. The medical device of claim 10 wherein the wire of each electrode is disposed along the convex outer surface.

12. The medical device of claim 11 wherein a plurality of electrode pairs is disposed along the convex outer surface.

13. The medical device of claim 9 wherein the distal tip comprises a plurality of rounded protrusions extending from the exterior surface of the distal end.

14. The medical device of claim 13 wherein the distal tip comprises a plurality of electrode pairs and a plurality of rounded protrusions extending from the exterior surface of the distal end, and wherein the wires of each different electrode pair are disposed along an outer surface of a different protrusion.

15. The medical device of claim 1 wherein the distal tip comprises a plurality of fluid ports configured to distribute fluid to an exterior surface of the distal tip, wherein said fluids port are in fluid communication with an interior space of the distal tip.

16. The medical device of claim 1 wherein the distal tip comprises one or more suction ports that suck fluid from the exterior of the distal tip into an interior space of the shaft.

17. The medical device of claim 1 wherein the distal tip comprises one or more irrigation ports to provide irrigation fluid.

18. The medical device of claim 1 wherein the distal tip comprises one or more light sources.

19. The medical device of claim 18 wherein the light source is on an exterior surface of the distal end of the distal tip.

20. The medical device of claim 1 wherein the shaft comprises a non-conductive polymer jacket.

21. The medical device of claim 20 wherein the polymer is a 50-70 durometer polymer.

22. The medical device of claim 1 wherein the shaft comprises a composite material.

23. The medical device of claim 22 wherein the composite material comprises fibers set within a thermoset matrix.

24. The medical device of claim 1 wherein the device is operable to measure impedance and/or temperature.

25. A medical device, comprising:
a handle;
a bendable non-conductive shaft extending distally from the handle, said shaft comprising a distal tip, wherein the distal tip comprises at least one pair of electrodes on an exterior surface of a distal end of the distal tip;
at least one fluid port configured to distribute fluid to an exterior surface of the distal tip, wherein said fluid port is in fluid communication with an interior space of the distal tip; and
a control switch, wherein articulating the control switch causes fluid to flow from one of a plurality of fluid sources to the interior space and causes the electrodes to emit radio frequency energy,
wherein each pair of electrodes includes a supply electrode and return electrode,
wherein each electrode comprises an isolated wire disposed on the exterior surface of the distal end,
wherein the distal tip comprises a plurality of rounded protrusions extending from the exterior surface of the distal end, and
wherein the wire of each electrode is disposed along an outer surface of one of said rounded protrusions.

26. A medical device, comprising:
a handle;
a bendable non-conductive shaft extending distally from the handle, said shaft comprising a distal tip, wherein the distal tip comprises at least one pair of electrodes on an exterior surface of a distal end of the distal tip;
at least one fluid port configured to distribute fluid to an exterior surface of the distal tip, wherein said fluid port is in fluid communication with an interior space of the distal tip; and
a control switch, wherein articulating the control switch causes fluid to flow from one of a plurality of fluid sources to the interior space and causes the electrodes to emit radio frequency energy,
wherein each pair of electrodes includes a supply electrode and return electrode,
wherein each electrode comprises an isolated wire disposed on the exterior surface of the distal end, and
wherein the distal end of the distal tip comprises a substantially planar exterior surface.

27. The medical device of claim 26 wherein each electrode comprises a substantially flat surface facing distally from the distal end.

28. The medical device of claim 27 wherein the distal end of the distal tip comprises a plurality of electrode pairs.

29. The medical device of claim 27 wherein articulating the switch to stop the flow of fluid from both fluid sources mechanically interrupts a flow of RF energy to the electrodes.

30. The medical device of claim 29 wherein the control switch is operably connected to a three-way stopcock.

31. The medical device of claim 30 wherein the control switch is operably connected to the stopcock via stepper motor that advances movement of the stopcock.

32. The medical device of claim 29 wherein the control switch is a three-way switch operably connected to a plurality of roller clamps.

33. The medical device of claim 32 wherein articulating the control switch causes the roller clamps to clamp or release a fluid line in fluid connection with one of the fluid sources and the lumen of the handle.

* * * * *